US012754374B2

(12) United States Patent
Tang et al.

(10) Patent No.: US 12,754,374 B2
(45) Date of Patent: Oct. 6, 2026

(54) EDGE COUPLER AND METHOD OF FORMING THE SAME

(71) Applicant: TAIWAN SEMICONDUCTOR MANUFACTURING COMPANY LTD., Hsinchu (TW)

(72) Inventors: Cheng-Tse Tang, Hsinchu County (TW); Chewn-Pu Jou, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 766 days.

(21) Appl. No.: 17/822,139

(22) Filed: Aug. 25, 2022

(65) Prior Publication Data

US 2024/0069276 A1 Feb. 29, 2024

(51) Int. Cl.

*G02B 6/30* (2006.01)
*G02B 6/12* (2006.01)
*G02B 6/132* (2006.01)

(52) U.S. Cl.

CPC ......... *G02B 6/305* (2013.01); *G02B 6/12004* (2013.01); *G02B 6/132* (2013.01); *G02B 2006/12147* (2013.01)

(58) Field of Classification Search

CPC .... G02B 6/12004; G02B 6/132; G02B 6/305; G02B 2006/12147

See application file for complete search history.

(56) References Cited

U.S. PATENT DOCUMENTS

| | | | | |
|---|---|---|---|---|
| 11,366,269 | B2 * | 6/2022 | Bian | G02B 6/136 |
| 11,808,995 | B2 * | 11/2023 | Bian | G02B 6/4203 |
| 11,860,421 | B2 * | 1/2024 | Song | G02B 6/305 |
| 2018/0180818 | A1 * | 6/2018 | Jiang | G02B 6/1228 |
| 2022/0252785 | A1 * | 8/2022 | Bian | G02B 6/1225 |
| 2023/0187566 | A1 * | 6/2023 | Bian | G02B 6/1228 257/431 |
| 2023/0280550 | A1 * | 9/2023 | Karimelahi | G02B 6/1228 385/28 |
| 2023/0314708 | A1 * | 10/2023 | Bian | G02B 6/12004 385/14 |
| 2023/0314718 | A1 * | 10/2023 | Liu | G02B 6/12004 385/43 |
| 2024/0036263 | A1 * | 2/2024 | Eid | G02B 6/305 |

* cited by examiner

*Primary Examiner* — Daniel Petkovsek
(74) *Attorney, Agent, or Firm* — WPAT LAW; Anthony King

(57) ABSTRACT

A method includes: receiving a substrate; and forming an edge coupler on the substrate, the edge coupler configured to receive light. The forming includes: depositing a first edge coupling member extending in a first direction in a first layer over the substrate; and depositing a second edge coupling member extending in the first direction in a second layer over the first layer. Each of the first and second edge coupling members has a width measured in a second direction monotonically non-decreasing in the first direction. One of the first and second edge coupling members includes a portion in a concave shape and the other includes a portion in a convex shape.

20 Claims, 30 Drawing Sheets

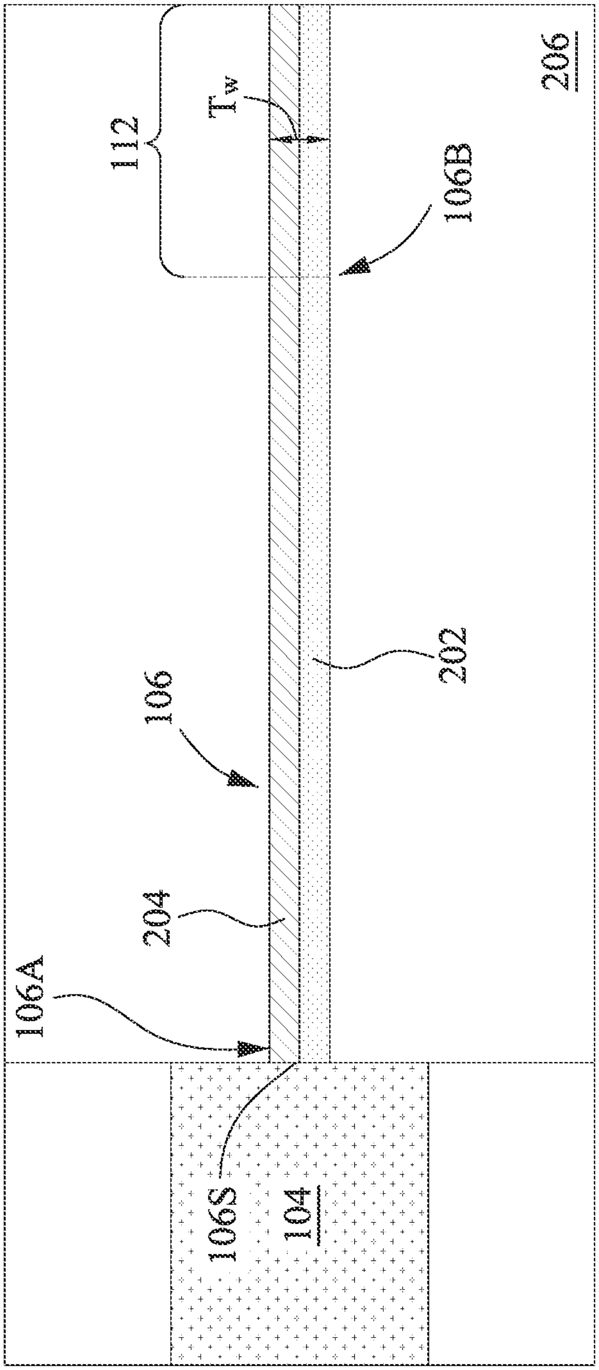
FIG. 2B
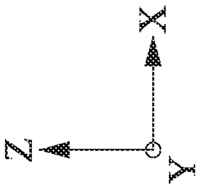

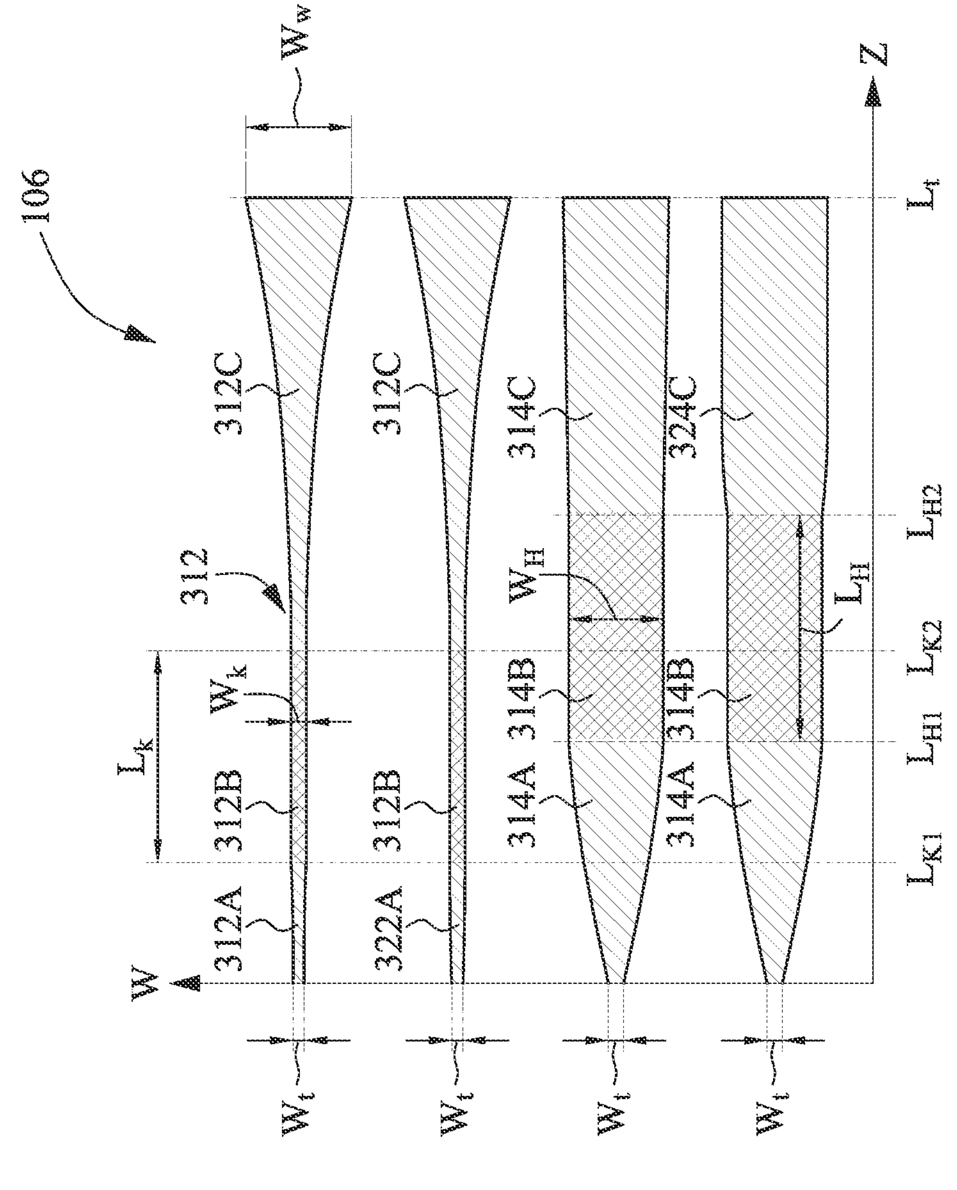
FIG. 3B
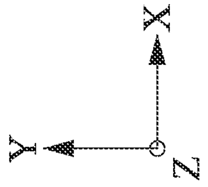

EDGE COUPLER AND METHOD OF FORMING THE SAME

BACKGROUND

Modern technology advances, such as big data, cloud computation, cloud storage, and Internet of Things (IoT), have driven exponential growth of various applications in processing and communications of data, e.g., high performance computers, data centers, and long-haul telecommunication. To address the emerging need of high data rate transmission, a modern semiconductor structure may include optical elements for providing optical data links to improve the data transmission rate of existing electrical data links. In the development of incorporating optical data links to the semiconductor device, the challenge of reducing device size of the optical data links has attracted a great deal of attention.

BRIEF DESCRIPTION OF THE DRAWINGS

Aspects of the embodiments of the present disclosure are best understood from the following detailed description when read with the accompanying figures. It is noted that, in accordance with the standard practice in the industry, various structures are not drawn to scale. In fact, the dimensions of the various structures may be arbitrarily increased or reduced for clarity of discussion.

FIGS. 2A and 2B are a top view and a cross-sectional view, respectively, of a single-tip edge coupler of the photonic device shown in FIG. 1, in accordance with some embodiments of the present disclosure.

FIG. 3B shows top views of a single-tip edge coupler, in accordance with some embodiments of the present disclosure.

DETAILED DESCRIPTION

Figure 1:
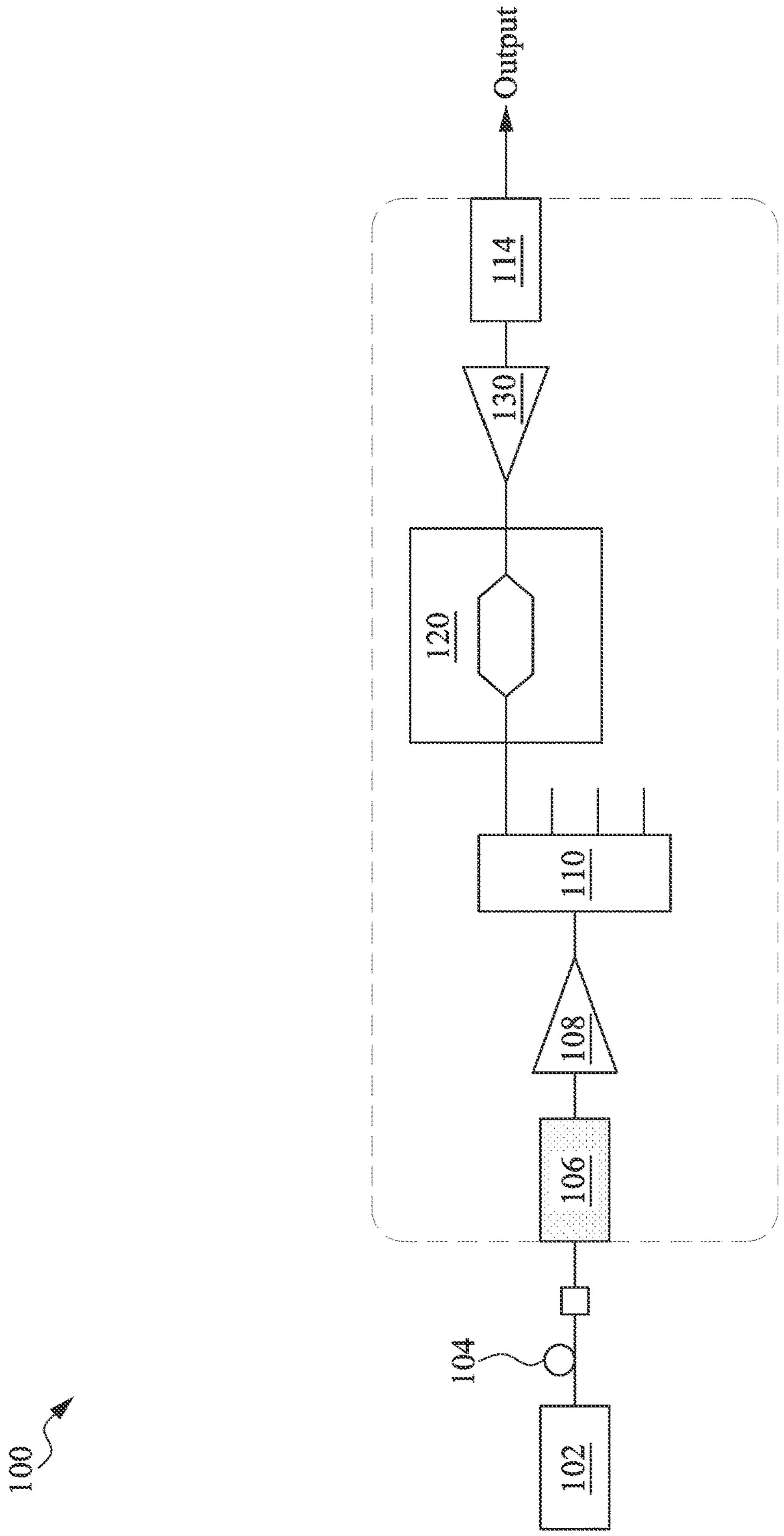
FIG. 1 is a block diagram of a photonic system, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “over,” “upper,” “on,” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as “first,” “second” and “third” describe various elements, components, regions, layers and/or sections, these elements, components, regions, layers and/or sections should not be limited by these terms. These terms may be only used to distinguish one element, component, region, layer or section from another. The terms such as “first,” “second” and “third” when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms “about,” “substantial” or “substantially” generally mean within 10%, 5%, 1% or 0.5% of a given value or range. Alternatively, the terms “about,” “substantial” or “substantially” mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms “about,” “substantial” or “substantially.” Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

Embodiments of the present disclosure an optical edge coupler and a method of forming the optical edge coupler. Modern optical waveguides and optical edge couplers may be implemented with a silicon-based material due to its low transmission loss and compatibility with existing semiconductor fabrication processes. The edge coupler is useful in a photonic transmission/receiving system since it is used to convert the light beam from an optical fiber with a light field diameter of about 10 μm to a light beam traveling in a waveguide with the light field diameter less than that of the optical fiber, about 1 μm. Further, a typical edge coupler may have a coupling length up to hundreds of μm. As a result, the task of device size miniaturization becomes very challenging for incorporating the optical device into the semiconductor devices with smaller size. Further, polarization-dependent loss of the edge coupler due to mode mismatch is commonly observed due to design constraints. Therefore, the light coupling performance of the edge coupler may be compromised by the device size.

The present disclosure proposes a dual-member edge coupler to effectively enhancing the light coupling performance of the edge coupler. The proposed edge coupler incorporates two edge coupling members with different coupling design used for individually optimizing the coupling performance of the transverse electric (TE) and transverse magnetic (TM) modes of the light beam. Further, auxiliary edge couplers are also adopted to enhance the light coupling performance. As a result, the coupling performance of the edge coupler is improved while the coupling length of the edge coupler can be reduced by about one half.

FIG. 1 is a block diagram of a photonic system 10, in accordance with some embodiments of the present disclosure. In some embodiments, the photonic system 10 is part of an optical link used to transmit high-speed data with a modulated light beam. In some embodiments, the photonic system 10 is configured to transmit an electrically modulated optical signal between two or more electrical devices. In some embodiments, the photonic system 10 is incorporated into a semiconductor package and configured to convert electrical signals to optical signals, and vice versa, between interconnected semiconductor devices.

The photonic system 10 may include an optical source 102, an optical fiber 104 and a photonic device 100. In some embodiments, the optical source 102 is configured to generate a light beam, e.g., with a wavelength centered at 850 nm, 1310 nm or 1550 nm. The optical source 102 may be a laser diode or a light-emitting diode. In some embodiments, the optical fiber 104 is configured to transmit the light beam to the photonic device 100. The optical fiber 104 may include a core component (not separately shown) and a cladding layer (not separately shown) wrapping around the core component, in which the light beam is allowed to propagate in the core component. The materials of the core component and the cladding layer may be determined to cause the light beam to travel in the optical fiber with minimal transmission loss. In some embodiments, the core component is made of a silica-based or plastic material, and the cladding layer is formed of, e.g., fluorinated polymer. In some embodiments, the optical fiber 104 includes an outer coating layer or a jacket layer (not separately shown) for providing additional cladding and/or protection functions. In some embodiments, the optical fiber 104 is classified into a single-mode optical fiber and a multimode optical fiber. In the depicted example, the optical fiber 104 is a single-mode optical fiber.

The photonic device 100 may include an input-stage edge coupler 106, a grating coupler 108, a splitter 110, an optical modulator 120, a grating coupler 130, and an output-stage edge coupler 114. In some embodiments, some of the abovementioned elements can be omitted, or additional optical elements can be added to the photonic device 100 where appropriate. The input-stage edge coupler 106 may be used to couple the incoming light beam from the optical fiber 104 to the photonic device 100, e.g., the grating coupler 108 of the photonic device 100. In some embodiments, the input-stage edge coupler 106 directs the light beam from a sidewall of the input-stage edge coupler 106 or a substrate of the photonic device 100 for facilitating processing of the light beam in the photonic device 100.

The grating coupler 108 is configured to couple the light beam from the optical fiber 104 or the input-stage edge coupler 106 to a waveguide of the splitter 110. In some embodiments, the grating coupler 108 includes an array of trenches or grooves on a surface of a waveguide of the grating coupler 108 to form a diffractive optical structure, which can help change the off-plane wave-vector direction of the light beam into an in-plane wave-vector direction of the waveguide of the splitter 110. The coupling efficiency of the grating coupler 108 may be related to the grating pitch, the grating depth, and the tilt angle and relative position of the input light beam, e.g., the tilt angle and the position of the incoming light beam are determined through tuning of the input-stage edge coupler 106.

In some embodiments, the grating coupler 108 is omitted, and the input-stage edge coupler 106 is coupled directly to the splitter 110 or subsequent optical devices.

In some embodiments, the splitter 110 is configured to spit the incoming light beam into two or more light beams. The split light beams may be processed with various functions to include different optical properties, and may be combined in a later stage.

In some embodiments, one of the split light beams is fed into the optical modulator 120. The optical modulator 120 may perform electro-optical phase modulation to change the delay or the phase of the incoming light beam. After the processing of the optical modulator 120, the modulated light beam may become an information-bearing light beam to carry data in optical form. Alternatively, the optical modulator 120 may serve the function of optical calibration to adjust the phase or delay of the split light beams before they are combined in a subsequent stage.

After modulated or calibrated by the optical modulator 120, the light beam is transmitted to the grating coupler 130. The grating coupler 130 is configured to couple the light beam from a waveguide of the optical modulator 120 to the output-stage edge coupler 114. In some embodiments, the grating coupler 130 includes an array of trenches or grooves on a surface of a waveguide of the grating coupler 130 to form a diffractive optical structure, which can help change the an in-plane wave vector direction in the waveguide of the optical modulator 120 to an off-plane wave-vector direction for the output-stage edge coupler 114. The coupling efficiency of the grating coupler 130 may be related to the grating pitch, the grating depth, and the tilt angle and relative position of the output light beam, e.g., the tilt angle and the position of the outgoing light beam are determined through arrangement of the output-stage edge coupler 114. In some embodiments, the parameters of the grating coupler 130 is similar to or different from those of the grating coupler 108.

In some embodiments, the grating coupler 130 is omitted, and the output-stage edge coupler 114 directly couples the optical modulator 120 to an output device.

The output-stage edge coupler 114 may be used to couple the incoming light beam from the photonic device 100, e.g., the grating coupler 130, to an output device, e.g., another optical fiber. In some embodiments, the output-stage edge coupler 114 directs the light beam the light beam from the grating coupler 130 to a sidewall of the output-stage edge coupler 114 or a sidewall of a substrate in the photonic device 100 for facilitating processing of the light beam external to the photonic device 100.

Figure 2A:
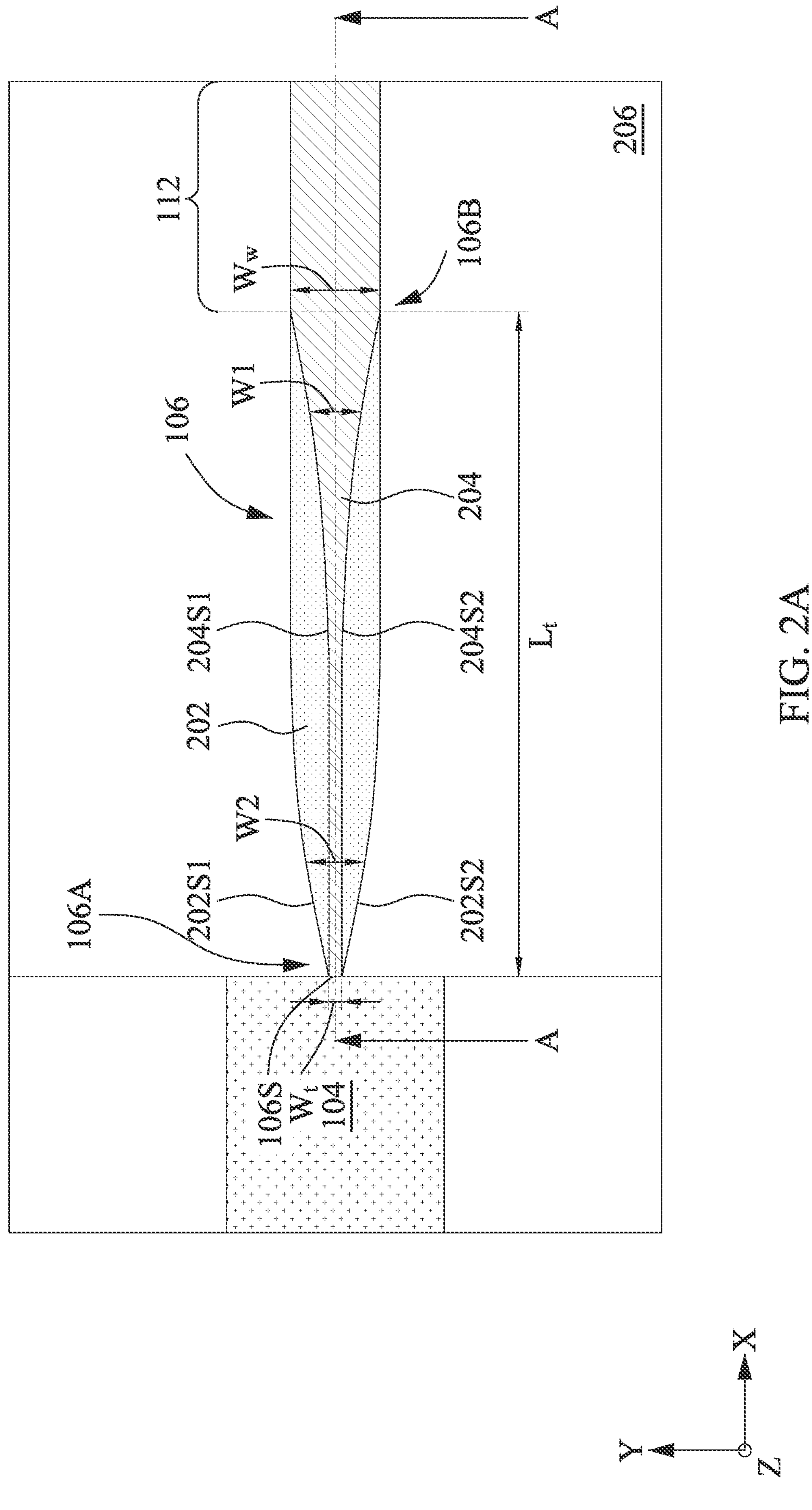

FIGS. 2A and 2B are a top view and a cross-sectional view, respectively, of the input-stage edge coupler 106 of the photonic device shown in FIG. 1, in accordance with some embodiments of the present disclosure. FIG. 2B shows the cross-sectional view taken along the sectional line AA of FIG. 2A. Although FIGS. 2A and 2B only illustrate the input-stage edge coupler 106, the output-stage edge coupler 114 can be formed or operated in a reciprocal way with respect to the input-stage edge coupler 106. Throughout the present disclosure, the input-stage edge coupler 106 and the output-stage edge coupler 114 are collectively referred to as the edge coupler 106. In some embodiments, the edge coupler 106 is referred to herein as a single-tip edge coupler 106.

Referring to FIG. 2A, the edge coupler 106 may include a first end 106A having a sidewall 106S coupled to the optical fiber 104, and a second end 106B connected to a waveguide 112. In some embodiments, the optical fiber 104 has a mode field diameter, e.g., in a range between about 8 μm and about 10 μm, greater than the width Wt (measured along the Y-axis) or the height Tw (measured along the Z-axis) of the sidewall 106S. In some embodiments, the width Wt is in a range between about 0.1 μm and about 10 μm. In some embodiments, the optical fiber 104 is encapsulated with a cladding material. The optical fiber 104 may be formed as a separate entity and included in a semiconductor package along with the edge coupler 106. Alternatively, the optical fiber 104 is integrated with the edge coupler 106 in a semiconductor device.

In some embodiments, the edge coupler 106 is arranged in a substrate (not shown in FIG. 2A or 2B but illustrated as substrate 702 in FIGS. 7A to 7J). In some embodiments, the substrate includes bulk silicon or other elementary semiconductor materials, and at least part of the substrate includes a cladding layer 206 of the edge coupler 106. In other words, the edge coupler 106 serves as the core component of the optical coupling medium in which the light beam propagates with the cladding layer 206 serving as the cladding material for the core component. In some embodiments, the cladding layer 206 includes a refractive index less than the refractive index of the material of the edge coupler 106. In some embodiments, the edge coupler 106 is formed of materials of a relatively high refractive index, e.g., undoped silicon, silicon nitride, polymers, or the like. In some embodiments, the cladding layer 206 is formed of silicon oxide, silicon nitride, or the like.

In some embodiments, the edge coupler 106 extends in a direction, e.g., along the X-axis, different from, e.g., perpendicular to, the direction of the sidewall 106S, e.g., along the Y-axis. The edge coupler 106 may have a varying width W measured in a direction along the Y-axis and a uniform length Lt measured in a direction along the X-axis.

In some embodiments, the edge coupler 106 includes two edge coupling members 202 and 204 stacked over one another in the vertical direction, e.g., along the Z-axis. In some embodiments, each of the edge coupling members 202, 204 alone can be regarded as an edge coupler. The edge coupling members 202 and 204 may be formed of the same or different materials. The edge coupling members 202 and 204 each function as an independent edge couplers but with different coupling properties. In some embodiments, the edge coupling members 202 and 204 are configured to couple the input light beam from the optical fiber 104 to the waveguide 112 through the transverse electric (TE) mode and the transverse magnetic (TM) mode, respectively, of the light beam, or alternatively, through the TM mode and the TE mode, respectively.

As shown in FIG. 2A, in an embodiment, the edge coupling member 204 is arranged over the edge coupling member 202. In some embodiments, the edge coupling member 204 is formed directly on an upper surface of the edge coupling member 202. The edge coupling members 202, 204 may have substantially equal heights or thicknesses Tw/2. In some embodiments, each of the edge coupling members 202, 204 is an (inverted) taper tapered in the direction of X-axis from the second end 106B to the first end 106A. The edge coupling member 202 includes lateral sides 202S1 and 202S2 between the first end 106A and the second end 106B, and the edge coupling member 204 includes lateral sides 204S1 and 204S2 between the first end 106A and the second end 106B. The lateral sides 202S1 and 202S2 are symmetrical with respect to the longitudinal axis (parallel to the Y-axis) of the edge coupling member 202. Likewise, the lateral sides 204S1 and 204S2 are symmetrical with respect to the longitudinal axis (parallel to the Y-axis) of the edge coupling member 204. A width W1 of the edge coupling member 202 measured in the Y-axis is determined by the distance between the lateral sides 202S1, 202S2 measured in the Y-axis. Similarly, a width W2 of the edge coupling member 204 in the Y-axis is determined by the distance between the lateral sides 204S1, 204S2 measured in the Y-axis.

In some embodiments, the sides 202S1, 202S2, 204S1, 204S2 are at least partially non-linear from a top-view perspective. In some embodiments, each of the sides 202S1, 202S2, 204S1, 204S2 is overall curved or non-linear from a top-view perspective. On the one hand, the single-tip edge coupler 106 is used to convert the optical mode of the light beam from the larger-sized optical fiber 104 to the smaller-sized waveguide 112, and therefore the width W1 or W2 of the edge coupling members 202, 204 should be made progressively increased or equal (or monotonically non-decreasing) along the longitudinal direction of the edge coupling member 202 or 204. On the other hand, the energy of the light beam is concentrated in one or more dominant optical components corresponding to one or more critical coupling width Wc. Therefore, the coupling efficiency of the edge coupling members 202, 204 would be determined based on whether the range of the width W1 or W2 of the respective edge coupling member 202 or 204 includes the critical widths Wc. The greater percentage the critical widths Wc is included, the better optical coupling performance the edge coupling member 202 or 204 will achieve. Based on the foregoing, since the coupling performance of the edge coupling members 202, 204 is determined by the critical width Wc, the coupling performance of the edge coupling members 202, 204 would be determined by the distribution of the width W1 or W2, i.e., the shapes of the lateral sides 202S1, 202S2, 204S1, 204S2.

Figure 3A:
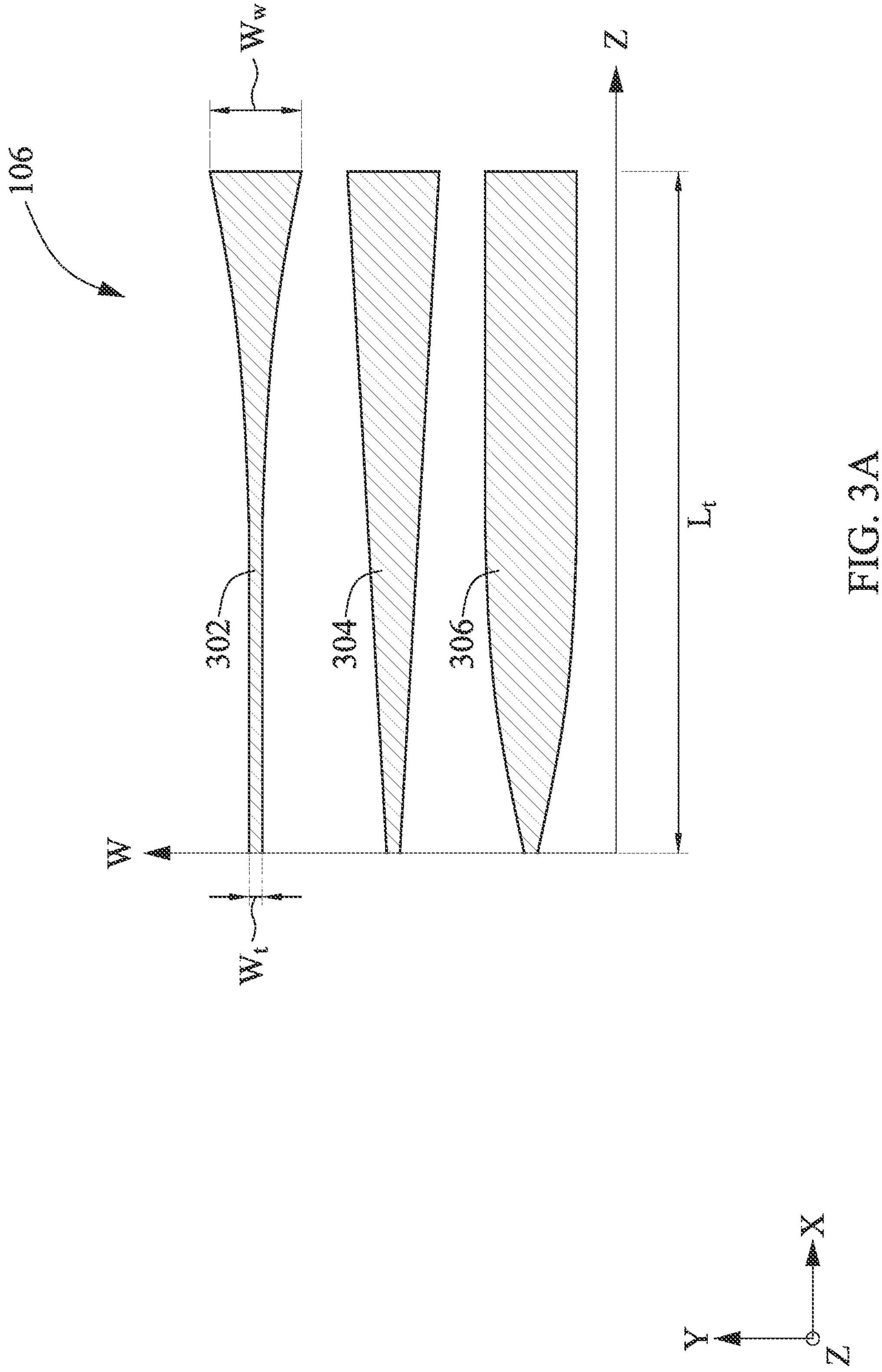
FIG. 3A shows top views of a single-tip edge coupler, in accordance with some embodiments of the present disclosure.

In some embodiments, as discussed previously, the width W1 or W2 progressively increases from the first end 106A to the second end 106B. In some embodiments, the width W1 or W2 has a minimal value Wt at the sidewall 106S or the first end 106A. In some embodiments, the width W1 or W2 has a maximal value Ww at the second end 106B or the sidewall of the waveguide 112. In some embodiments, the width Ww is substantially equal to the width of the waveguide 112. FIG. 3A shows top views of various edge coupling members 302, 304, 306, in accordance with some embodiments of the present disclosure. Referring to FIG. 3A, a monotonically increasing function is adopted for generating the lateral sides of the edge coupling members 302, 304, 306, as shown Equation (1) as follows:

$$W(z) = W_t + (W_W - W_t)\left[\frac{z}{L_t}\right]^{\alpha},\ 0 \le z \le L_t \tag{1}$$

In Equation (1) above, the argument z represents the horizontal location along the X-axis, the output W represents the width W1 or W2 obtained through Equation (1) given different ranges of the exponent α. The lateral sides can be obtained through the width W directly. In Equation (1), the constant Wt represents the initial width at the first end 106A, and the constant Ww represents the final width at the second end 106B. The exponent α determines the type and level of curvature of the lateral side expressed by Equation (1).

In some embodiments, each of the edge coupling members 202, 204 has a width W measured in the direction of Y-axis monotonically non-decreasing in the direction of X-axis. In some embodiments, one of the edge coupling members 202, 204 includes at least a portion in a concave shape, and the other of the edge coupling members 202, 204 includes at least a portion in a convex shape. In some embodiments, the edge coupling member 204 is fully overlapped with the edge coupling member 202.

In some embodiments, as illustrated in FIG. 3A, the shapes of the lateral sides of the edge coupling members 302, 304, 306 can be classified into three types given different ranges of the exponent α: (A) the edge coupling member 302 shows a concave shape, which is obtained under the condition of α>1; (B) the edge coupling member 304 shows a trapezoid shape, which is obtained under the condition of α=1; (C) the edge coupling member 306 shows a convex shape, which is obtained under the condition of α<1. In some embodiments, the edge coupling member 302 is referred to as a fully concave shape, meaning that the width of the edge coupling member 302 is monotonically increasing with a concave shape. In some embodiments, the edge coupling member 306 is referred to as a fully convex shape, meaning that the width of the edge coupling member 306 is monotonically increasing with a convex shape.

In some embodiments, since the polarization-dependent loss observed during the optical coupling of the edge coupler 106 may cause noticeable coupling loss, and the edge coupler 106 with a single edge coupling member 202 or 204 can only be optimized for only either the TE mode or the TM mode, the coupling performance would not be enhanced significantly. As such, the dual-member design of the edge coupler 106 uses the edge coupling members 202 and 204 to receive and guide the light beam components in the TE mode and TM mode separately. Since the critical widths Wc's for the TE mode and the TM mode of the same light beam may be different, the edge coupling members 202 and 204 can include different shapes for allocating a majority of the widths W1 or W2 to be around the critical widths Wc of the TE mode and TM mode, respectively. The optical coupling performance can thus be improved, and the polarization-dependent loss can be mitigated.

In some embodiments, the critical width Wc of the edge coupling member 202 or 204 is determined based on factors such as the selection of the TE/TM mode, the refractive index of the edge coupling members 202, 204, the refractive index of the cladding layer 206, the fiber mode diameter of the light beam, the thickness or height of the edge coupler 106, and the like. In some embodiments, the critical width Wc of the edge coupling member 202 or 204 corresponding to the dominant optical components of the light beam of interest is included in the range of Wt<=W<=Ww. In some embodiments, if the critical width Wc is closer to the width Wt than to the width Ww, the optimal shapes of the edge coupling member 202 or 204 would tend to be formed like the edge coupling member 302 with a concave shape, e.g., formed with the condition of α>1, since a majority of the width distribution for the edge coupling member 202 or 204 tends to be closer to the width Wt. In some other embodiments, if the critical width Wc is closer to the width Ww than to the width Wt, the optimal shapes of the edge coupling member 202 or 204 would tend to be formed like the edge coupling member 306 with a convex shape, e.g., formed with the condition of α<1, since a majority of the width distribution of the edge coupling member 202 or 204 tends to be closer to the width Ww. The edge coupling member 304 can be seen as a boundary case of both the edge coupling members 302 and 306 since the width W of the edge coupling member 304 is uniformly distributed between the initial width Wt and the final width Ww, and is closer to neither the initial width Wt nor the final width Ww. In the depicted example, the edge coupling member 202 is in a convex shape with the exponent of about α=0.5 optimized for the TE mode, and the edge coupling member 204 is in a concave shape with the exponent of about α=3 optimized for the TM mode.

FIG. 3B shows top views of various edge coupling members 312, 314, 322 and 324, in accordance with some embodiments of the present disclosure. In some embodiments, the edge coupling members 312, 314, 322 and 324 are similar to the edge coupling members 302 and 306, respectively, except that the edge coupling member 312, 314, 322 and 324 include a section with a uniform width $W_K$ or $W_H$. For example, the edge coupling member 312 corresponds to the edge coupling member 302 and can replace the edge member 302 in the edge coupler 106, in which the edge coupling member 312 includes sections 312A, 312B and 312C connected in series. In some embodiments, the sections 312A, 312B and 312C can be expressed by Equation (2) shown below:

$$W(z) = \begin{cases} W_t + (W_K - W_t)\left[\frac{z}{L_{K1}}\right]^{\alpha_1}, & 0 \le z \le L_{K1} \\ W_K, & L_{K1} \le z \le L_{K2}, \\ W_K + (W_W - W_K)\left[\frac{z - L_{K2}}{L_t - L_{K2}}\right]^{\alpha_2}, & L_{K2} \le z \le L_t \end{cases} \tag{2}$$

In equation (2), the first exponent is determined as $\alpha_1>1$, representing the section 312A with a concave shape, while the second exponent is determined as $\alpha_2>1$, representing the section 312C with a concave shape. The section 312B has a uniform width $W_K$, corresponding to the dominant optical components $W_C$ of the light beam in one of the TE mode and the TM mode. In some embodiments, the lateral sides from different sections of the edge coupling member 312 meeting at the boundary of the location of $w=L_{K1}$ and $w=L_{K2}$ may include corners of transition, which may cause transmission loss. In some embodiments, the exponents $\alpha_1$, $\alpha_2$, and the lengths $L_{K1}$ and $L_{K2}$ are determined so that the corners of transition of lateral sides at the boundary between the sections 312A and 312B, and between the sections 312B and 312C, are minimized to reduce transmission loss.

In some embodiments, the edge coupling member 322 is similar to the edge coupling member 312 as expressed by Equation (2) and is formed of sections 322A, 312B and 312C. The width W of the section 322A is expressed by the same formula as the section 312A except that the exponent is determined as $\alpha_1<1$, representing that the section 322A has a convex shape. One of the edge coupling member 312 or 322 may be preferred over the other according to which one will exhibit less transition loss or a smaller corner at the boundary of the sections 312A (322A) and 312B.

In some embodiments, the edge coupling member 314, formed of sections 314A, 314B and 314C, is similar to the edge coupling member 312 or 322 and can be expressed by Equation (3) as follows:

$$W(z)=\begin{cases} W_t+(W_K-W_t)\left[\frac{z}{L_{H1}}\right]^{\alpha_3}, & 0\le z\le L_{H1} \\ W_H, & L_{H1}\le z\le L_{H2}, \\ W_H+(W_W-W_H)\left[\frac{z-L_{H2}}{L_t-L_{H2}}\right]^{\alpha_2}, & L_{H2}\le z\le L_t \end{cases} \tag{3}$$

In equation (3), the third exponent is determined as $\alpha_3<1$, representing the section 314A with a convex shape, while the fourth exponent is determined as $\alpha_4<1$, representing the section 314C with a concave shape. The section 314B has a uniform width $W_H$, corresponding to the dominant optical components of the light beam in the other one of the TE mode and the TM mode with respect to the edge coupling members 312, 322. In some embodiments, the lateral sides from different sections of the edge coupling member 314 meeting at the boundary of the location of $w=L_{H1}$ and $w=L_{H2}$ may include corners of transition, which may cause transmission loss. In some embodiments, the exponents $\alpha_3$, $\alpha_4$, and the lengths $L_{H1}$ and $L_{H2}$ are determined so that the corners of transition of lateral sides at the boundary between the sections 314A and 314B, and between the sections 314B and 314C are minimized to reduce transmission loss.

In some embodiments, the edge coupling member 324 is similar to the edge coupling member 314 as expressed by Equation (3) and is formed of sections 314A, 314B and 324C. The width W of the section 324C is expressed by the same formula as the section 314C except that the exponent is given as $\alpha_4>1$, representing that the section 324C has a convex shape. One of the edge coupling member 314 or 324 may be preferred over the other according to which one will exhibit less transition loss or a smaller corner at the boundary of the sections 314B and 314C (324C).

In some embodiments, the edge coupling member 312 or 322 is referred to herein as a partial concave shape, meaning that the edge coupling member 312 or 322 includes portions of a concave shape and portions with a uniform width while keeping the entire width monotonically non-decreasing. In some embodiments, the edge coupling member 314 or 324 is referred to herein as a partial convex shape, meaning that the edge coupling member 314 or 324 includes portions of a convex shape and portions with a uniform width while keeping and the entire width monotonically non-decreasing.

Although FIG. 3B illustrates four embodiments of edge coupling members, the present disclosure is not limited thereto. For example, the edge coupling members 312 or 322 can have the third section 312C with a convex shape. In some other embodiments, the edge coupling members 314 or 324 can have a first section 314A with a concave shape.

Figure 4A:
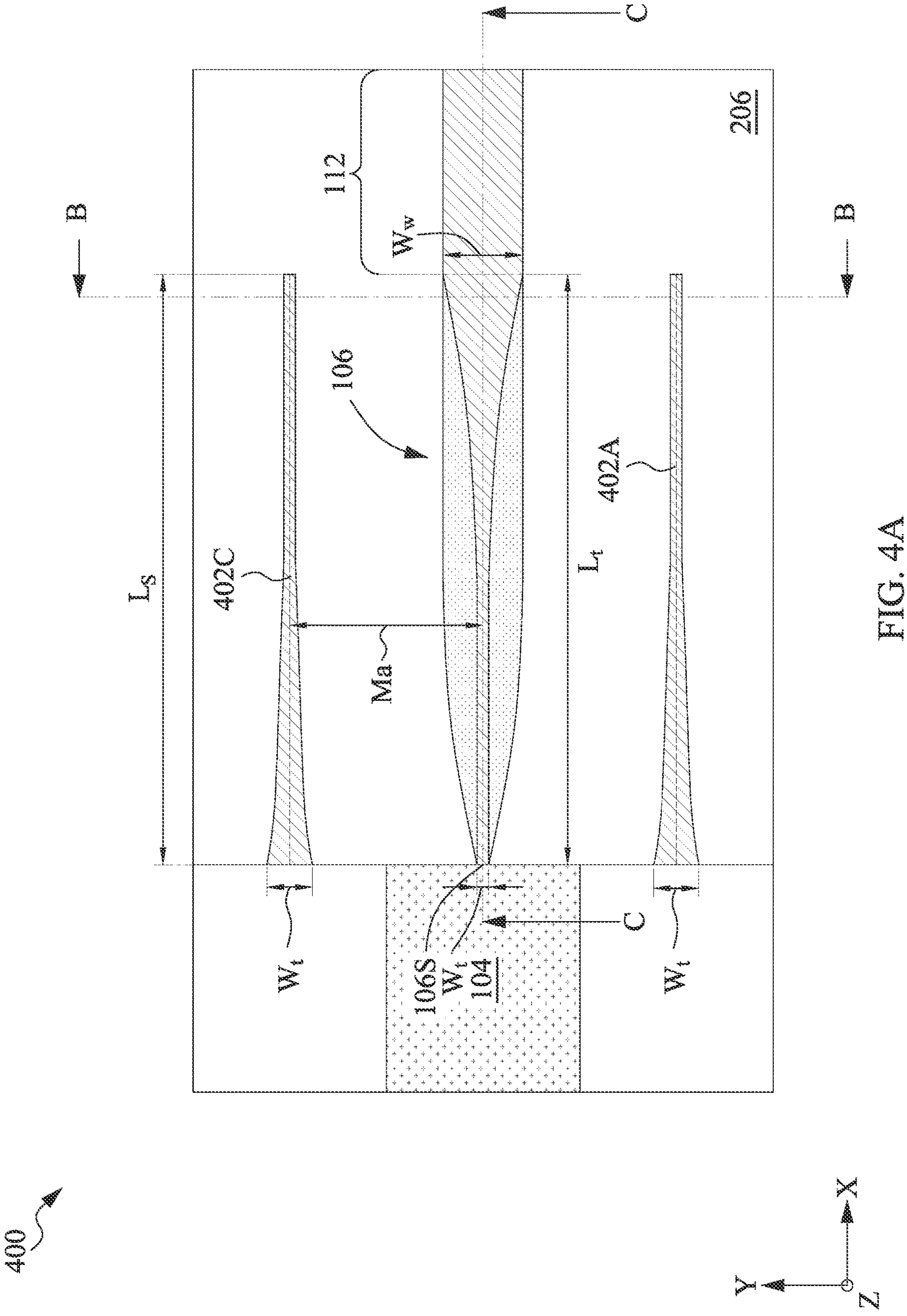
FIGS. 4A, 4B and 4C are a top view and two cross-sectional views, respectively, of a multi-tip edge coupler, in accordance with some embodiments of the present disclosure.
Figure 4B:
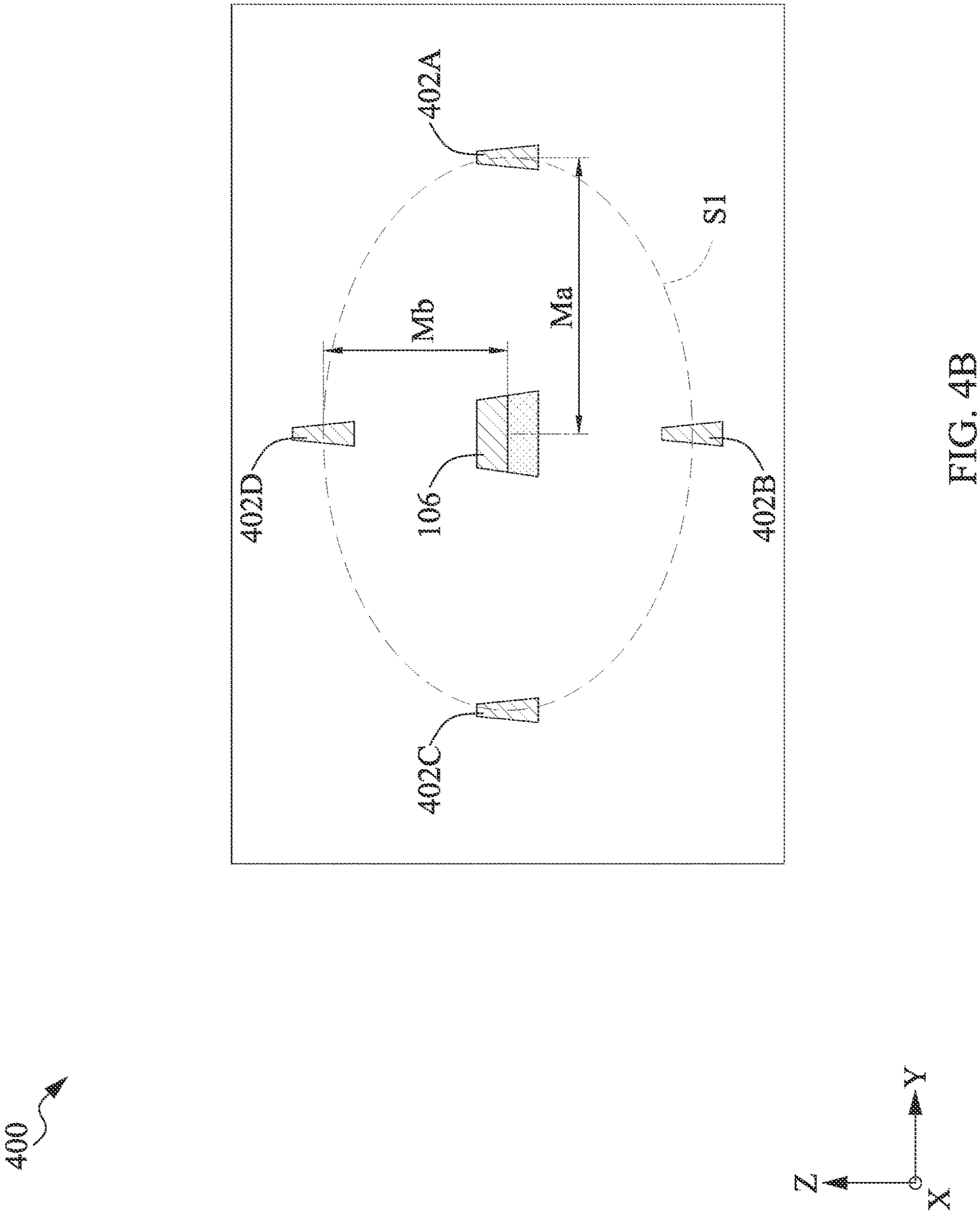
Figure 4C:
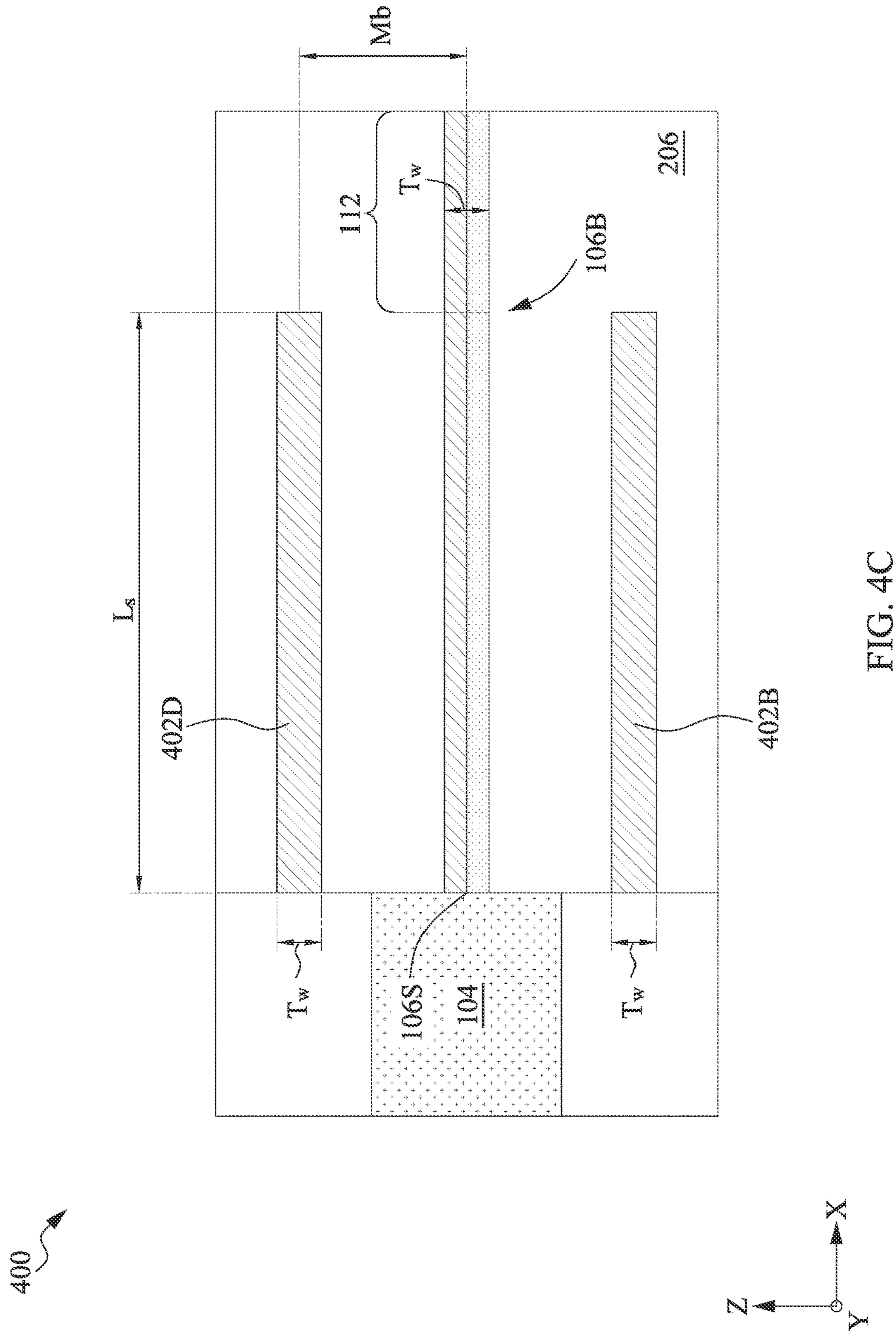

FIGS. 4A, 4B and 4C are a top view, and two cross-sectional views, respectively, of a multi-tip edge coupler 400, in accordance with some embodiments of the present disclosure. FIGS. 4B and 4C show the cross-sectional views taken along the sectional lines BB and CC, respectively, of FIG. 4A. In some embodiments, the multi-tip edge coupler 400 includes the single-tip edge coupler 106 and one or more auxiliary edge couplers 402 around the single-tip edge coupler 106. The single-tip edge coupler 106 shown in FIGS. 4A, 4B and 4C are similar to that shown in FIGS. 2A and 2B, and details of the single-tip edge coupler 106 will not be repeated for brevity.

In some embodiments, the auxiliary edge couplers 402, e.g., the auxiliary edge couplers 402A, 402B, 402C, and 402D, are another type of single-tip edge coupler different from the single-tip edge coupler 106. In some embodiments, the auxiliary edge couplers 402 are arranged around the single-tip edge coupler 106 to aid in optical coupling and guide the light beam from the optical fiber 104 to the edge coupler 106 and the waveguide 112. The mode mismatch between the optical fiber 104 and the waveguide 112 at the interface of the sidewall 106S can be further reduced. In some embodiments, as shown in FIG. 4B, the auxiliary edge couplers 402 are distributed on the circumference S1 of the optical mode field of the light beam propagating in the optical fiber 104. The auxiliary edge couplers 402 may be separated from the edge coupler 106. In some embodiments, the circumference S1 is in a circular or oval shape, depending upon the configuration of the optical fiber 104. In some embodiments, the optical mode field of the light beam is defined by a horizontal axis and a vertical axis, e.g., along the X-axis and the Y-axis, respectively, with respective axis lengths Ma and Mb. In some embodiments, the axis lengths Ma and Mb are substantially equal to one half of the optical mode diameter of the optical fiber 104 along the horizontal and vertical directions, respectively. In some embodiments, the four auxiliary edge couplers 402 are uniformly spaced apart on the circumference S1, e.g., the auxiliary edge couplers 402A and 402C are arranged on the two ends of the horizontal axis, and the auxiliary edge couplers 402B and 402D are arranged on the two ends of the vertical axis. In some embodiments, the auxiliary edge couplers 402A through 402D are arranged in different layers of the edge coupler 400, where the auxiliary edge couplers 402A and 402C are arranged in the same layers of the single-tip edge coupler 106. In some embodiments, the auxiliary edge couplers 402A and 402C are distant from the central edge coupler 106 by a substantially equal distance Ma, and the auxiliary edge couplers 402B and 402D are distant from the central edge coupler 106 by a substantially equal distance Mb. In some embodiments, a ratio between the axial lengths Ma/Mb is determined according to the ratio of the width Ww to thickness Tw of the waveguide 112 to reduce mode mismatch between the optical fiber 104 and the waveguide 112. In some embodiments, the ratio of the axial lengths Ma/Mb is substantially equal to the ratio of Tw/Ww.

In some embodiments, the auxiliary edge couplers 402 are formed of a material similar to the edge coupler 106. Referring to FIGS. 4A and 4C, in some embodiments, the auxiliary edge couplers 402 have a length Ls measured along the X-axis. In some embodiments, the length Ls is substantially equal to or less than the length Lt, e.g., about Lt/3<=Ls<=Lt, in a range about Lt/2<=Ls<=Lt, or in a range about Lt/3<=Ls<=Lt/2.

In some embodiments, the auxiliary edge couplers 402 have substantially equal widths measured in direction of the Y-axis. In some embodiments, the auxiliary edge couplers 402 have substantially equal heights or thicknesses measured in direction of the Z-axis. In some embodiments, the auxiliary edge couplers 402 have a width Wt measured in the Y-axis from a top-view perspective at the sidewall 106S, which is substantially equal to the initial width of the single-tip edge coupler 106. In some embodiments, the width W of the auxiliary edge couplers 402 is progressively decreased from the location corresponding to the first end 106A to the end of the auxiliary edge couplers 402. In some embodiments, the auxiliary edge couplers 402 tapers from a location corresponding to the sidewall 106S. In some embodiments, the lateral sides of the auxiliary edge coupler 402 is curved from a top-view perspective, e.g., in a shape similar to the sides of the edge coupling member 302 or 306 shown in FIG. 3A, or are straight lines from a top-view perspective, e.g., in a shape similar to the sides of the edge coupling member 304 shown in FIG. 3A. The arrangement of the inverted taper of the edge coupler 106 and the tapered auxiliary edge couplers 402 around the edge coupler 106 may facilitate the mode change of the light beam from the optical fiber 104 to the waveguide 112 with minimal coupling loss. In some embodiments, each of the auxiliary edge couplers 402 has a thickness Tw, which is substantially equal to that of the single-tip edge coupler 106 across the entire length Ls of the auxiliary edge coupler 402.

Figure 5A:
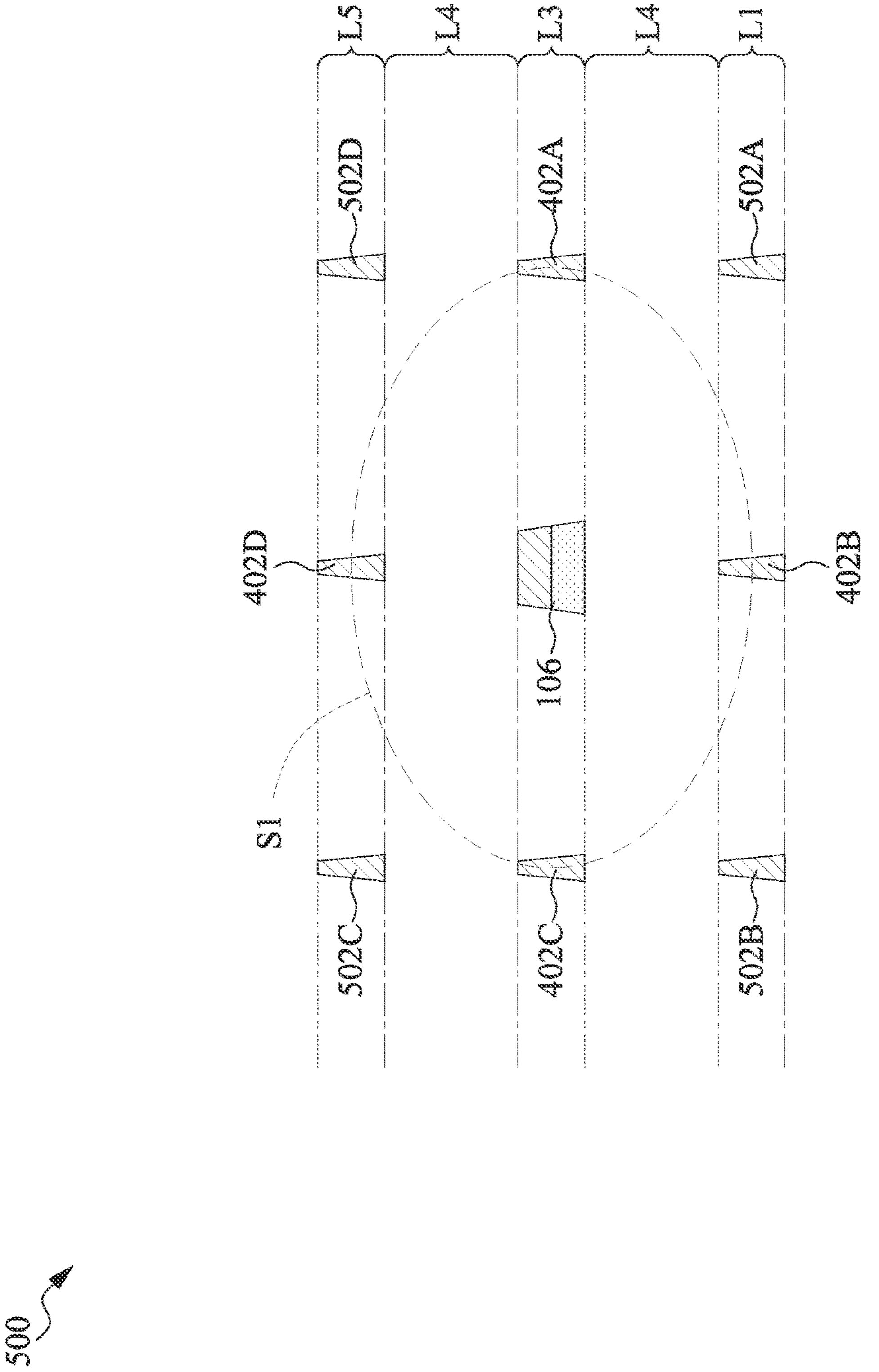
FIGS. 5A and 5B are cross-sectional views of a multi-tip edge coupler unit, in accordance with some embodiments of the present disclosure.

FIG. 5A is a cross-sectional views of a multi-tip edge coupler 500, in accordance with some embodiments of the present disclosure. The multi-tip edge coupler 500 and the multi-tip edge coupler 400 are similar in many aspects, and descriptions of these similar aspects will not be repeated for brevity. The difference between the multi-tip edge coupler 500 and the multi-tip edge coupler 400 lies in the incorporation of the auxiliary edge couplers 502A, 502B, 502C, 502D around the edge coupler 106. In some embodiments, the materials, dimensions and functions of the auxiliary edge couplers 502 are similar to the auxiliary edge couplers 402. The edge couplers 500 may be formed with a stack of layers L1 through L5. The auxiliary edge couplers 502 may form an edge coupler array together with the edge coupler 106 and the auxiliary edge couplers 402, in which the auxiliary edge couplers 402A, 402C and 106 are arranged in a layer L3 of the multi-tip edge coupler 500. The auxiliary edge couplers 502A and 502B may be arranged in the layer L1 of the multi-tip edge coupler 500 where the auxiliary edge couplers 402B resides. Likewise, the auxiliary edge couplers 502C and 502D may be arranged in the layer L5 where the auxiliary edge couplers 402D resides.

In some embodiments, the edge coupler 106 and the auxiliary edge couplers 402 and 502 form a rectangular array, in which any vertical spacing between the adjacent edge couplers 106, 402 or 502 in the rectangular array is substantially equal, or any horizontal spacing between the adjacent edge couplers 106, 402 or 502 in the rectangular array is substantially equal. In some embodiments, the spaces between the edge coupler 106 and the auxiliary edge couplers 402 and 502 and spaces in intermediate layers L2, L4 between the layers L1, L3 and L5 are filled with the material of the cladding layer 206. The introduction of the additional edge couplers 502 may improve the optical coupling efficiency between the optical fiber 104 and the waveguide 112 as compared to the multi-tip edge coupler 400. Further, the arrangement of the auxiliary edge couplers 502 in the same layer as the auxiliary edge couplers 402 would simplify the process and cost of the manufacturing of the multi-tip edge coupler 500.

Figure 5B:
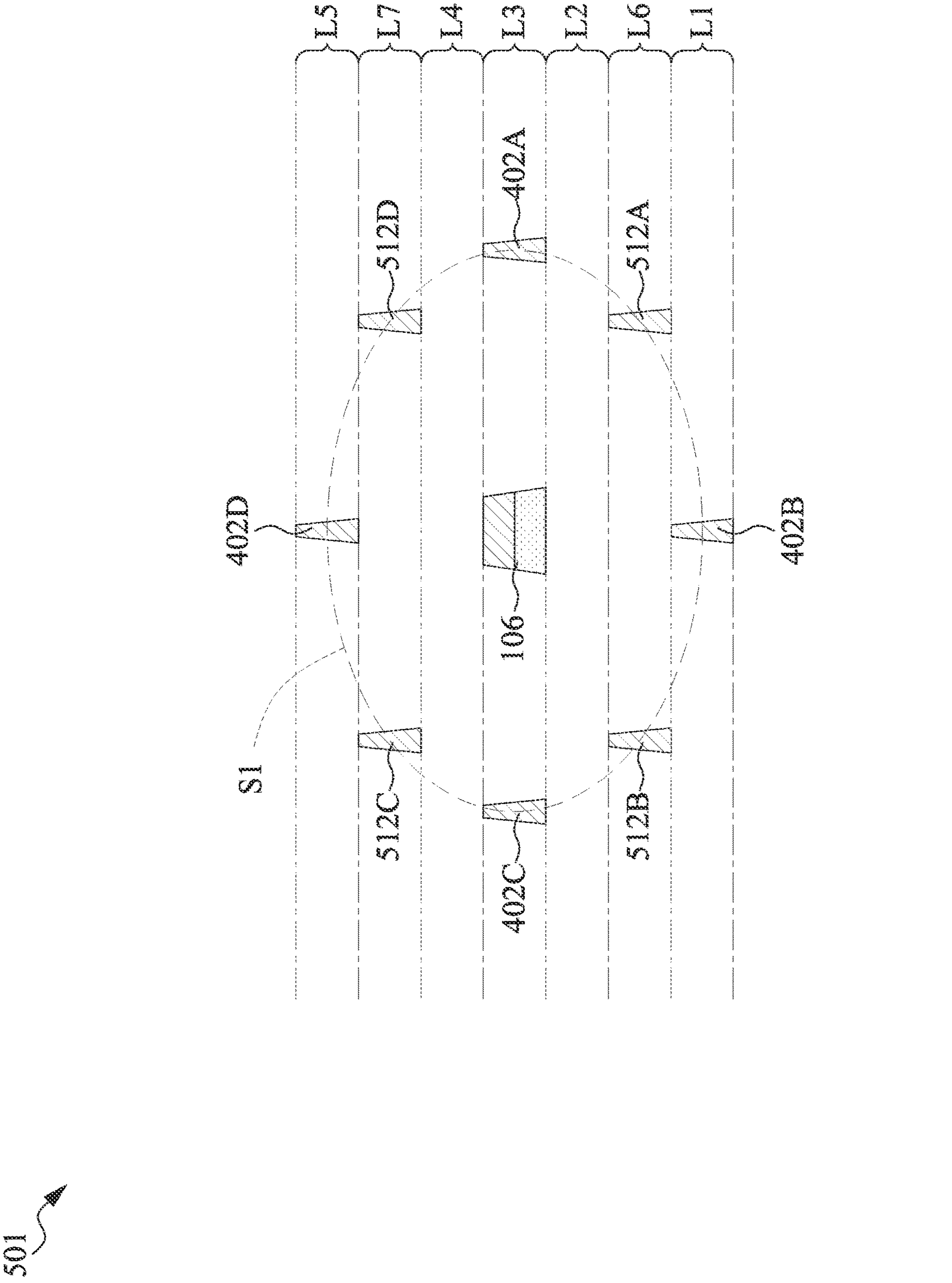

FIG. 5B is a cross-sectional views of a multi-tip edge coupler 501, in accordance with some embodiments of the present disclosure. The multi-tip edge coupler 501 and the edge coupler 500 are similar in many aspects, and descriptions of these similar aspects will not be repeated for brevity. The difference between the multi-tip edge coupler 501 and the multi-tip edge coupler 500 lies in the incorporation of the auxiliary edge couplers 512A, 512B, 512C, 512D around the single-tip edge coupler 106 in place of the auxiliary edge couplers 502. In some embodiments, the materials, dimensions and functions of the auxiliary edge couplers 512 are similar to the auxiliary edge couplers 402. The auxiliary edge couplers 512 may form an edge coupler array together with the edge coupler 106 and the auxiliary edge couplers 402, in which the auxiliary edge couplers 512A through 512D are formed on the circumference S1 where the auxiliary edge couplers 402 resides. In some embodiments, the auxiliary edge couplers 402 and 512 are uniformly distributed on the circumference S1. The multi-tip edge couplers 501 may be formed with layers L1 through L7. In some embodiments, the auxiliary edge couplers 512A and 512B are arranged in a layer L6 of the multi-tip edge coupler 501 between the layers L1 and L3. Likewise, the auxiliary edge couplers 512C and 512D may be arranged in a layer L7 of the multi-tip edge coupler 501 between the layers L3 and L5. In some embodiments, the spaces between the edge coupler 106 and the auxiliary edge couplers 402 and 512, and the spaces in intermediate layers L2, L4 are filled with the material of the cladding layer 206. The arrangement of the auxiliary edge couplers 512 may improve the optical coupling efficiency between the optical fiber 104 and the waveguide 112 as compared to the multi-tip edge coupler 500. Further, the arrangement of the auxiliary edge couplers 512 on the circumference S1 together with the auxiliary edge couplers 402 would further reduce the mode mismatch between the optical fiber 104 and the waveguide 112.

Figure 6A:
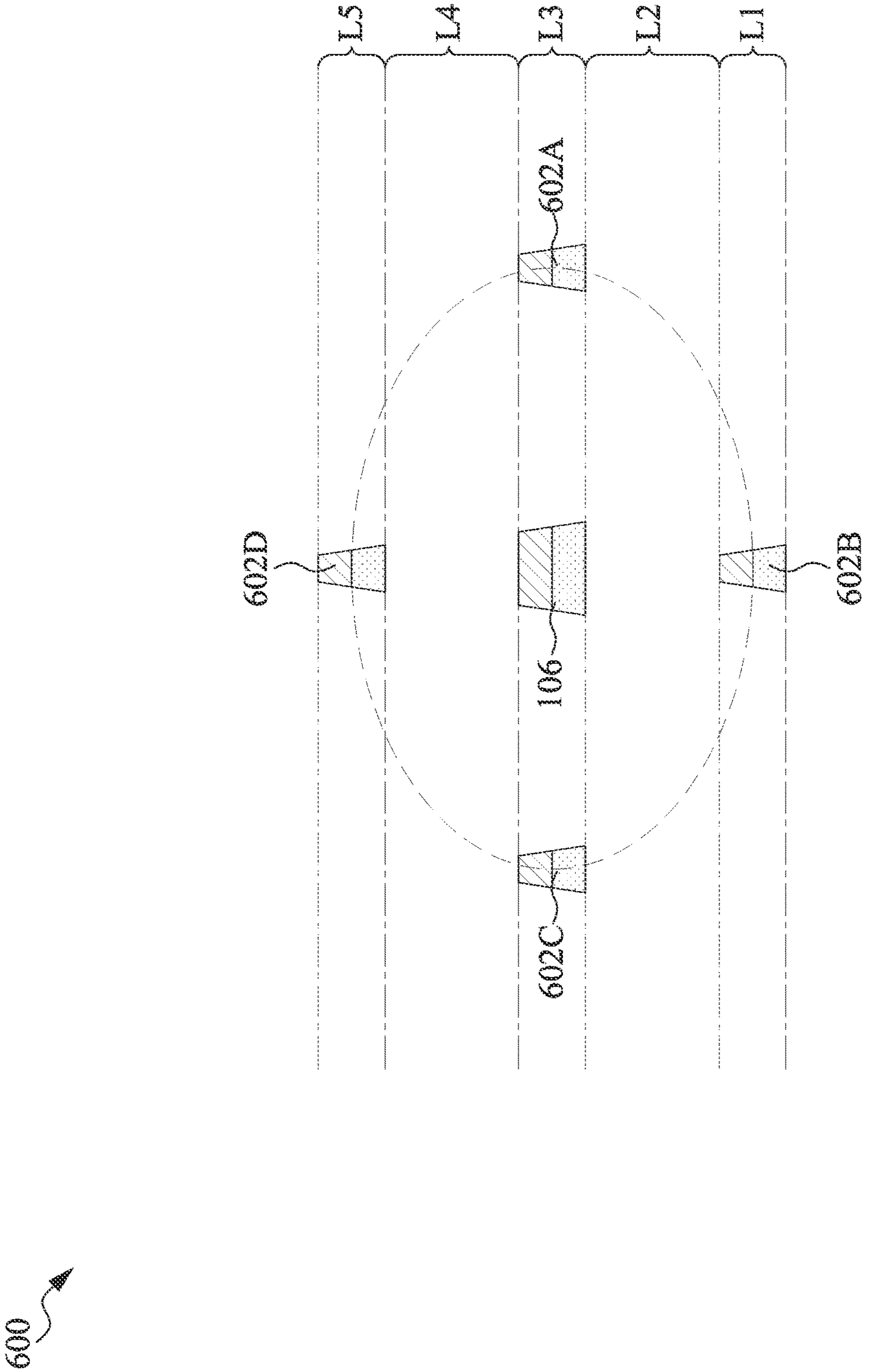
FIGS. 6A, 6B and 6C are cross-sectional views of a multi-tip edge coupler unit, in accordance with some embodiments of the present disclosure.

FIG. 6A is a cross-sectional view of a multi-tip edge coupler 600, in accordance with some embodiments of the present disclosure. The multi-tip edge coupler 600 and the edge coupler 400 are similar in many aspects, and descriptions of these similar aspects will not be repeated for brevity. The difference between the multi-tip edge coupler 600 and the multi-tip edge coupler 400 lies in that the auxiliary edge couplers 502 with the single edge coupling member structure is replaced with single-tip dual-member auxiliary edge couplers 602. The auxiliary edge couplers 602A, 602B, 602C, 602D are arranged around the single-tip edge coupler 106 in a manner similar to that of the auxiliary edge couplers 502A through 502D. Each of auxiliary edge couplers 602 may be formed with dual edge coupling members in a manner similar to the edge coupler 106. The mode mismatch reduction of the edge coupler 600 can be further improved due to the presence of the dual-members in the auxiliary edge couplers 602.

Figure 6B:
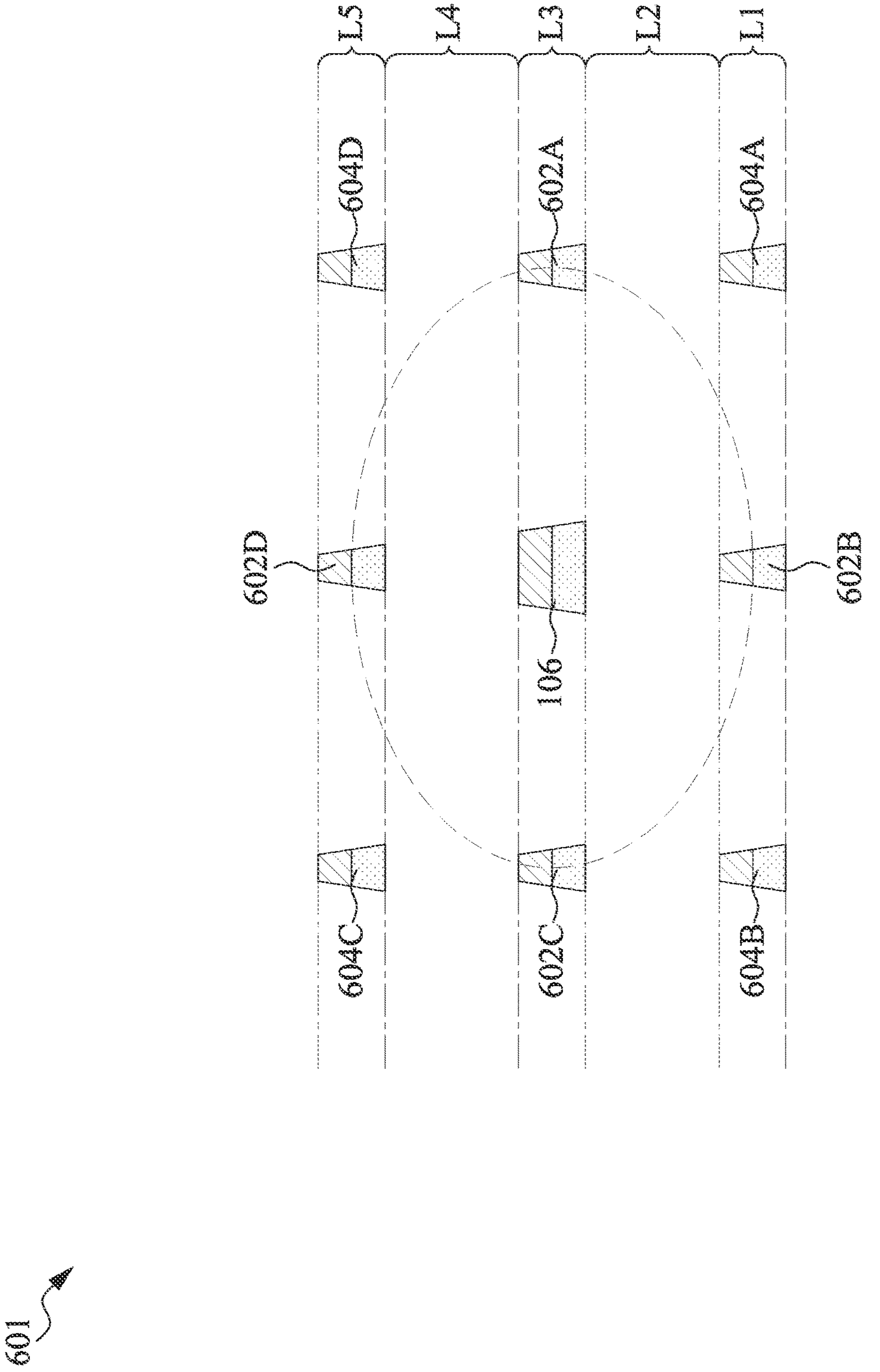
Figure 6C:
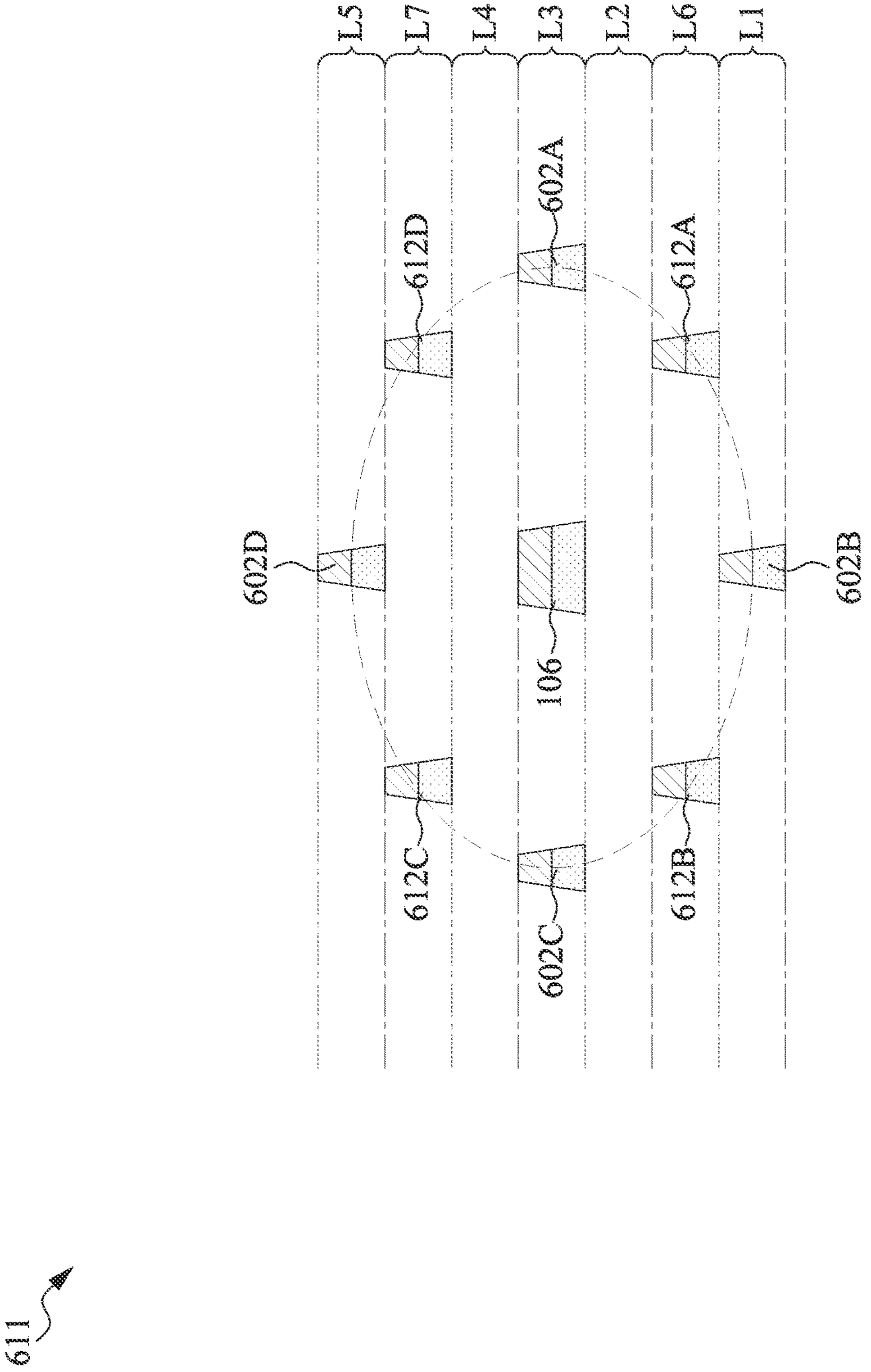

FIGS. 6B and 6C are cross-sectional view of multi-tip edge couplers 601 and 611, respectively, in accordance with some embodiments of the present disclosure. The multi-tip edge coupler 601 and 611 can be seen as the dual-member version of the multi-tip edge coupler 500 and 501, respectively, bearing a similar correspondence between the multi-tip edge couplers 400 and 600. The descriptions of the features of the multi-tip edge couplers 601, 611 shared with the multi-tip edge coupler 600 will not be repeated for brevity.

In some embodiments, the auxiliary edge couplers 604 may form an edge coupler array together with the edge coupler 106 and the auxiliary edge couplers 602, in which the auxiliary edge couplers 604A, 604C and 106 are arranged in a layer L3 of the edge coupler 601. The edge couplers 604A and 604B may be arranged in the layer L1 where the auxiliary edge couplers 602B resides. Likewise, the edge couplers 604C and 604D may be arranged in the layer L5 where the auxiliary edge couplers 602D resides.

In some embodiments, the auxiliary edge couplers 612 may form an edge coupler array together with the edge coupler 106 and the auxiliary edge couplers 612, in which the auxiliary edge couplers 612A through 612D are formed on the circumference S1 where the edge couplers 602 resides.

FIGS. 7A to 7J show top views and cross-sectional views of intermediate stages of a method of forming an edge coupler 700, in accordance with some embodiments of the present disclosure. It shall be understood that additional steps can be provided before, during, and after the steps shown in FIGS. 7A to 7J, and some of the steps described below can be replaced with other steps or eliminated. The order of the steps may be interchangeable. Some of the steps may be performed concurrently or independently. The subplots (a), (b), and (c) in each of FIGS. 7A to 7J represent a top view, a first cross-sectional view and a second cross-section view, respectively, of the edge coupler 700, wherein the first cross-sectional view and the second cross-sectional view are taken from sectional lines BB and CC, respectively, of the respective subplots (a).

Figure 7A:
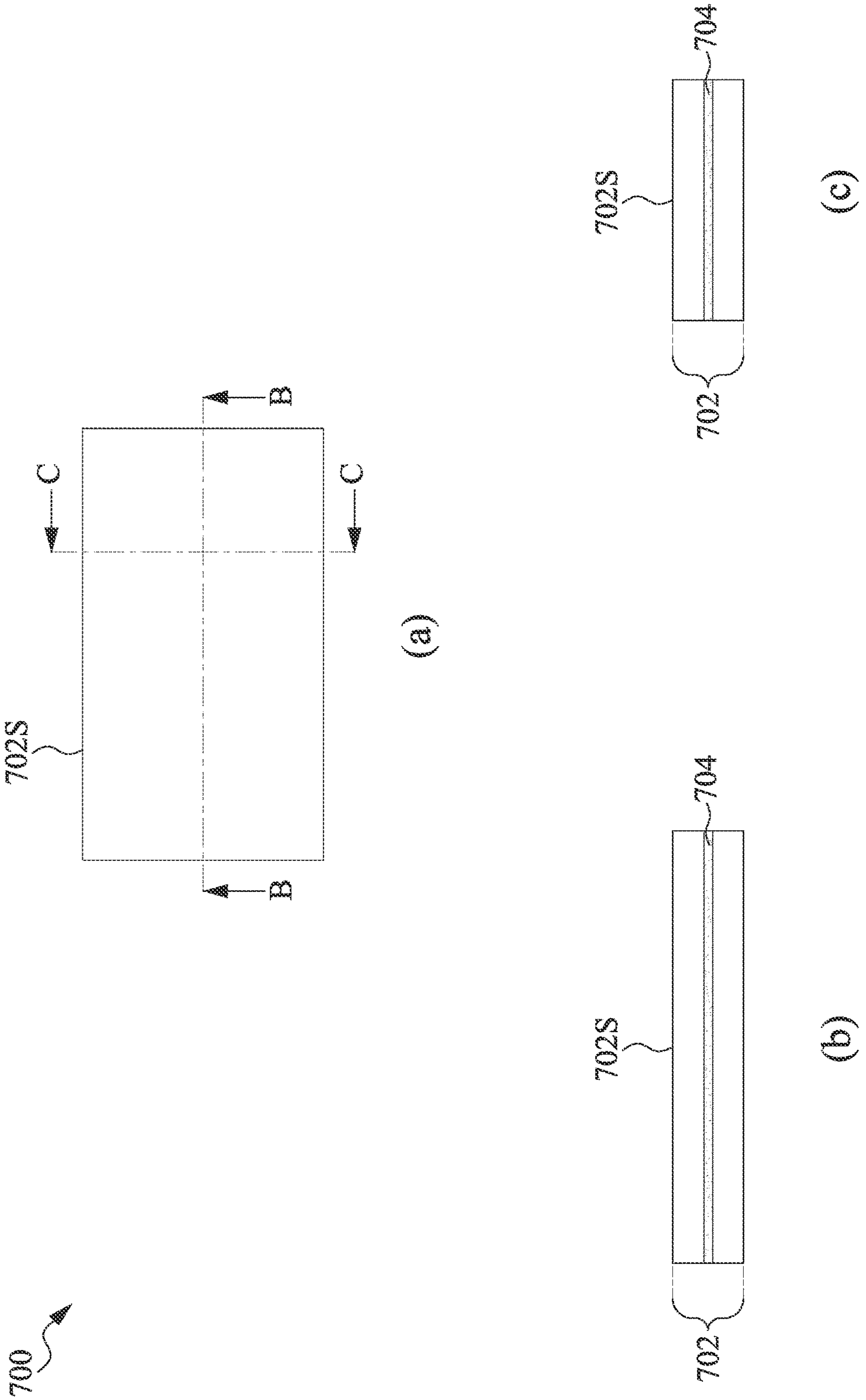
FIGS. 7A to 7J show top views and cross-sectional views of intermediate stages of a method of forming a single-tip edge coupler, in accordance with some embodiments of the present disclosure. Each of FIGS. 7A to 7J includes subplots (a), (b) and (c) corresponding to the top views and cross-sectional views, respectively.

Referring to FIG. 7A, a substrate 702 including an upper surface 702S is received or provided. In some embodiments, the substrate 702 includes silicon. In some embodiments, the substrate 702 is undoped. The substrate 702 may be bulk silicon. The substrate 702 may be a silicon-on-insulator (SOI) substrate, in which an insulating layer 704 is embedded in the substrate 702. The insulating layer 704 may be formed of a dielectric layer, e.g., silicon oxide, silicon nitride, or other suitable dielectric materials.

Figure 7B:
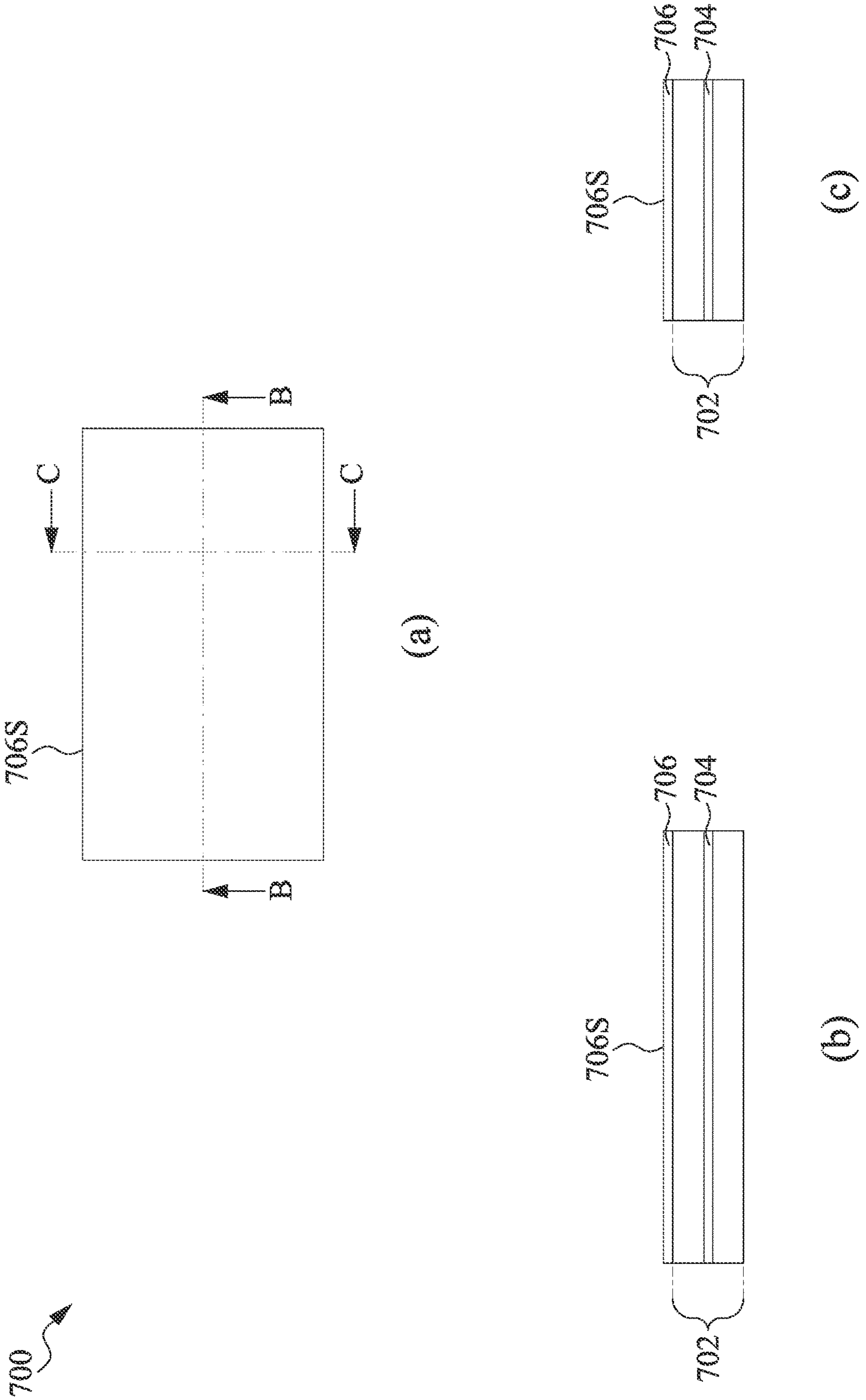

Referring to FIG. 7B, a cladding layer 706 with an upper surface 706S is formed over the substrate 702. In some embodiments, the cladding layer 706 includes silicon oxide, silicon nitride or other suitable materials. The cladding layer 706 may be formed by chemical vapor deposition (CVD), physical vapor deposition (PVD), atomic layer deposition (ALD), spin-coating, or other suitable operations.

Figure 7C:
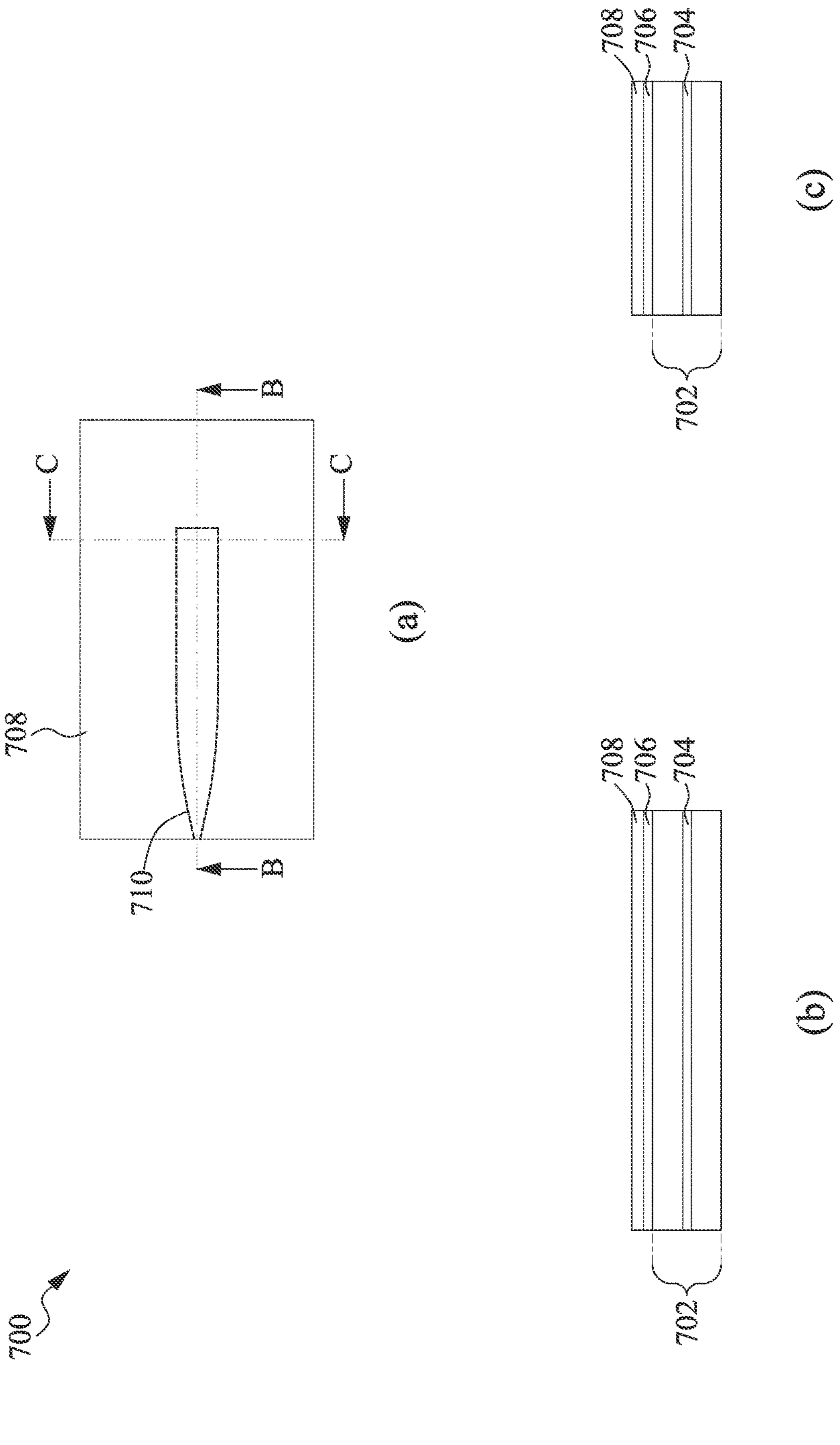

Referring to FIG. 7C, a material 708 of an edge coupling member 710 is formed over the cladding layer 706. In some embodiments, the material 708 includes undoped silicon, silicon nitride, polymers, or other suitable materials. The material 708 may be formed by CVD, PVD, ALD, or other suitable operations. In some embodiments, regions for the edge coupling member 710 are also defined, as shown by the dashed lines.

Figure 7D:
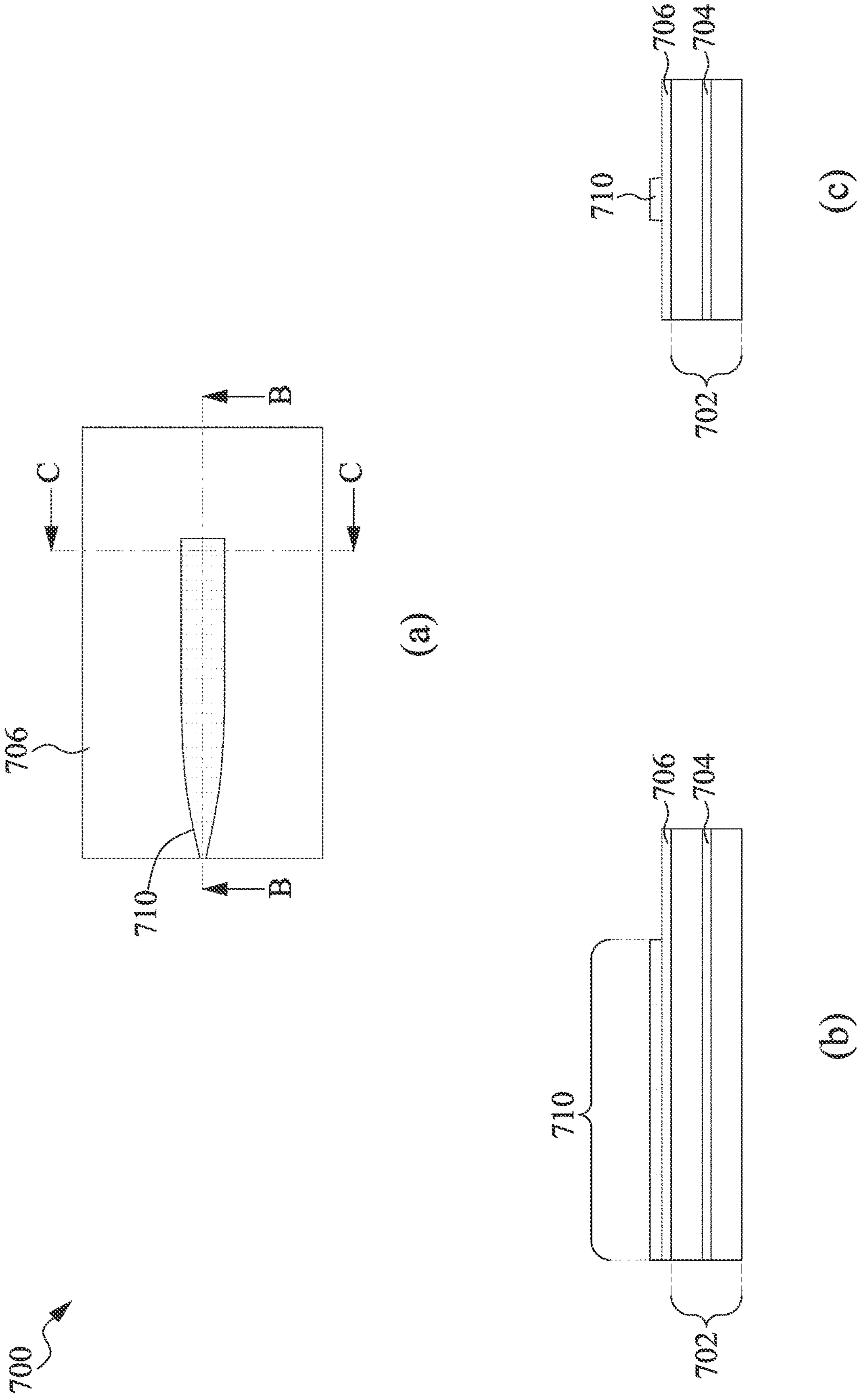

FIG. 7D illustrates the patterning of the edge coupling member 710. The edge coupling member 710 is similar to one of the edge coupling members 202 and 204, and is used to perform optical coupling between an optical fiber and a waveguide though one of a TE mode and a TM mode. Portions of the cladding layer 706 are exposed through the edge coupling member 710 during the patterning operation. The patterning operation may include lithography and etching operations. The etching operation may include a dry etch, a wet etch, a combination thereof (e.g., a reactive ion etch), or the like. In the depicted example, the edge coupling member 710 has a convex shape. Alternatively, the edge coupling member 710 may have a concave shape.

Figure 7E:
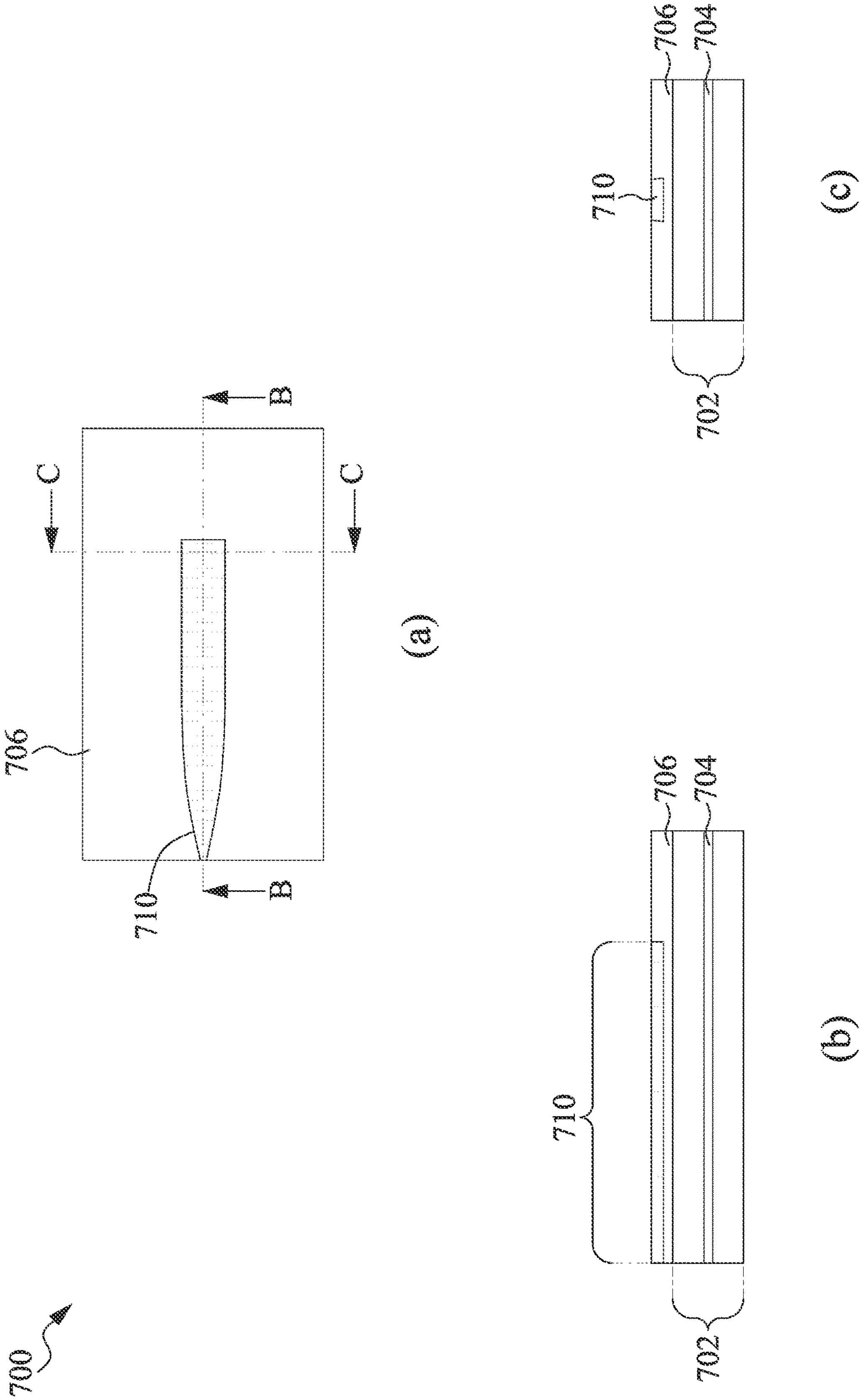

Referring to FIG. 7E, another deposition operation is performed to thicken the cladding layer 706. The thickened cladding layer 706 has an upper surface coplanar with the upper surface of the edge coupling member 710. In some embodiments, the formation method and material for the cladding layer 706 are similar to those used in the formation of the cladding layer 706 illustrated in FIG. 7B.

Figure 7F:
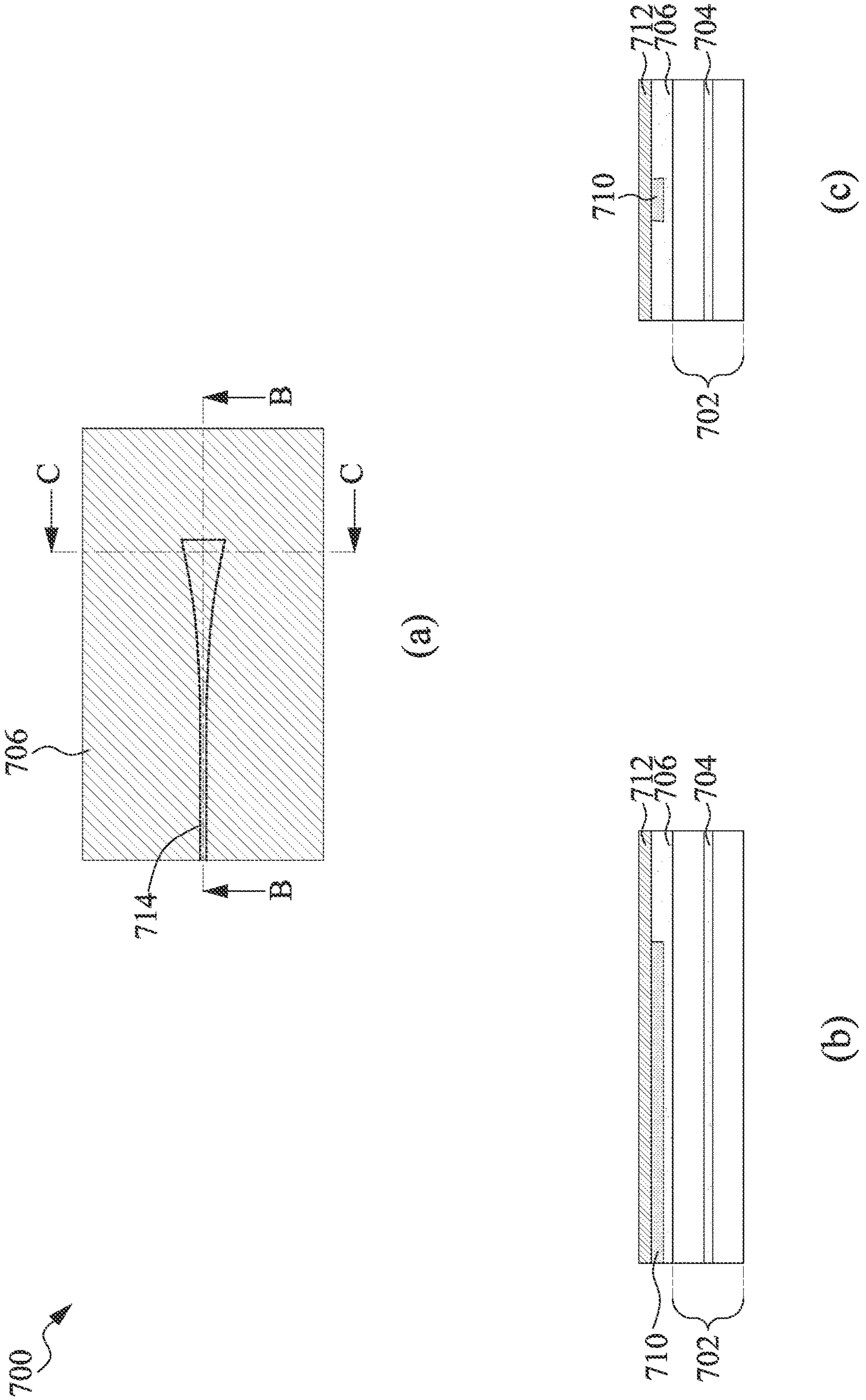

Referring to FIG. 7F, a material 712 of an edge coupling member 714 is deposited over the edge coupling member 710 and the cladding layer 706. In some embodiments, the material 712 includes undoped silicon, silicon nitride, polymers, or other suitable materials. The material 712 may be formed by CVD, PVD, ALD, or other suitable operations. In some embodiments, the material 712 may be different from the material 708. In some embodiments, regions for the edge coupling member 714 are also defined, as shown by the dashed lines.

Figure 7G:
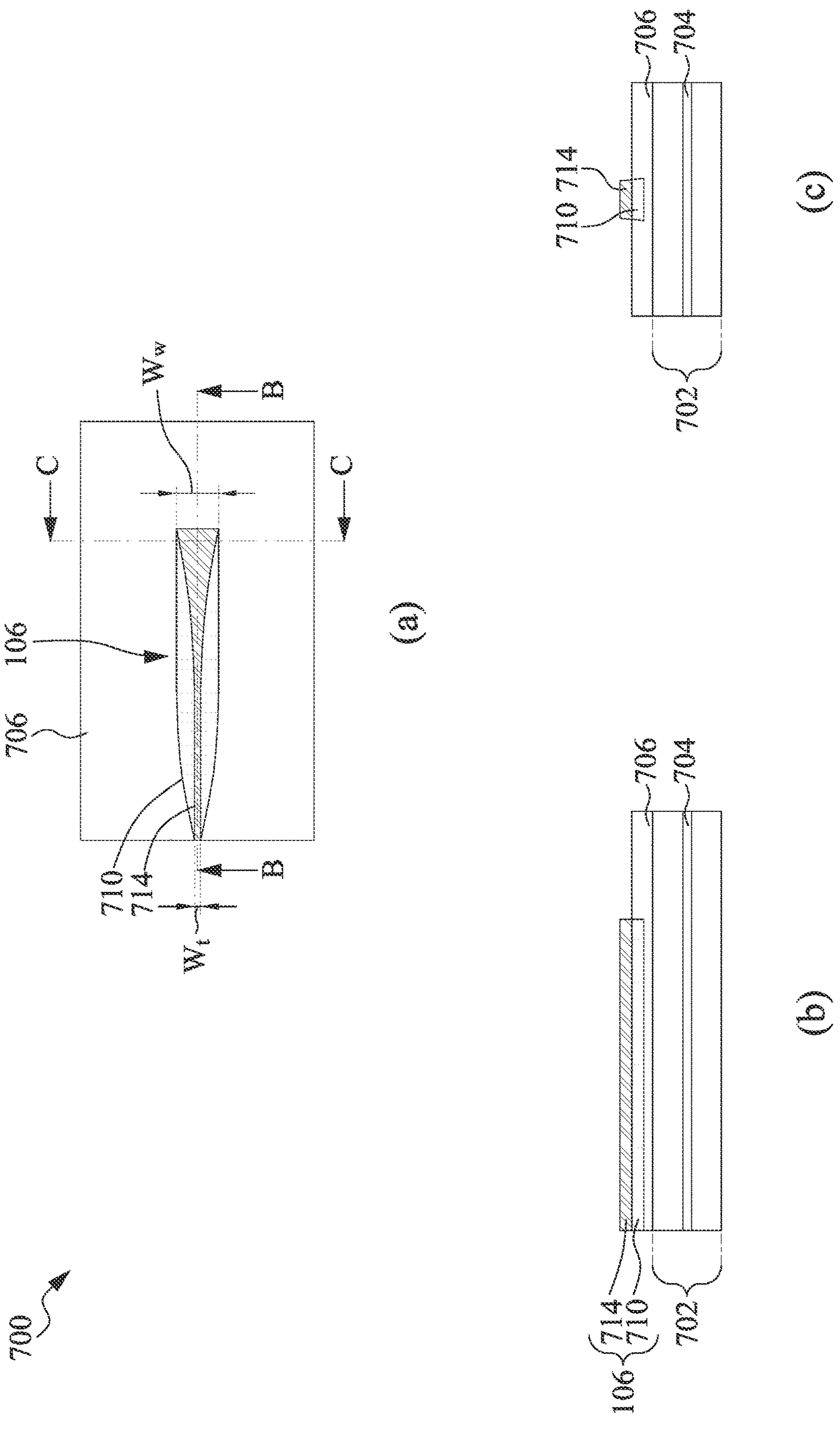

FIG. 7G illustrates the patterning of the edge coupling member 714. The edge coupling member 714 is similar to one of the edge coupling members 102 and 104, and is used to perform optical coupling between an optical fiber and a waveguide though the other one of a TE mode and a TM mode with respect to the edge coupling member 710. The patterning operation may include lithography and etching operations. The etching operation may include a dry etch, a wet etch, a combination thereof (e.g., a reactive ion etch), or the like. In the depicted example, the edge coupling member 714 has a concave shape. Alternatively, the edge coupling member 714 may have a convex shape. In some embodiments, the edge coupling members 710 and 714 have substantially equal initial widths Wt on a left side, and substantially equal final widths Ww on a right side. In some embodiments, the edge coupling member 710 is exposed through the edge coupling member 714. The edge coupling member 714 may be fully overlapped with the edge coupling member 710.

Figure 7H:
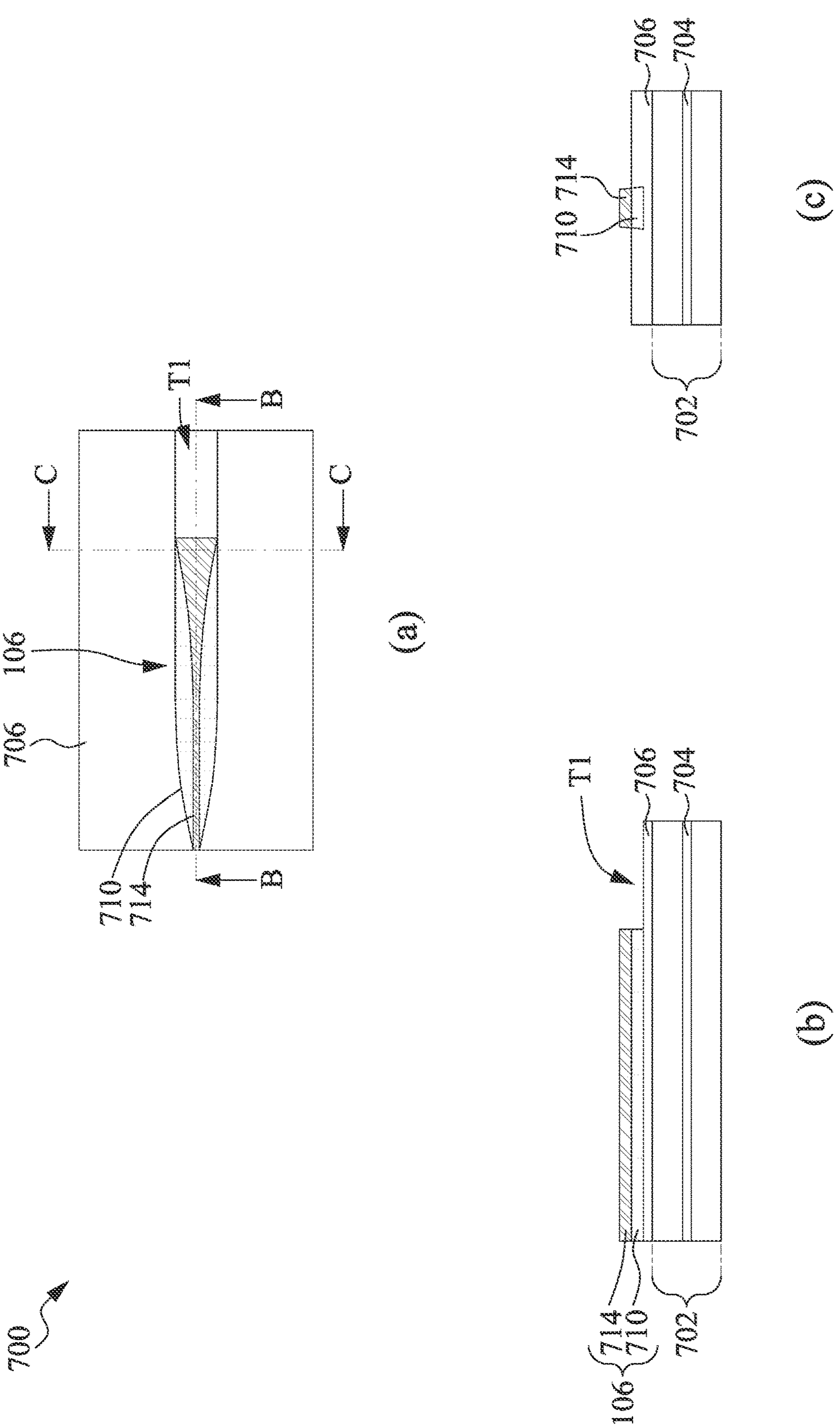

Referring to FIG. 7H, portions in the layer of the edge coupling member 710 reserved for a waveguide 716 is patterned. As a result, a trench T1 having the shape of the waveguide 716 from a tope-view perspective is formed, in which the trench T1 exposes the upper surface of the cladding layer 706. The patterning operation may include lithography and etching operations.

Figure 7I:
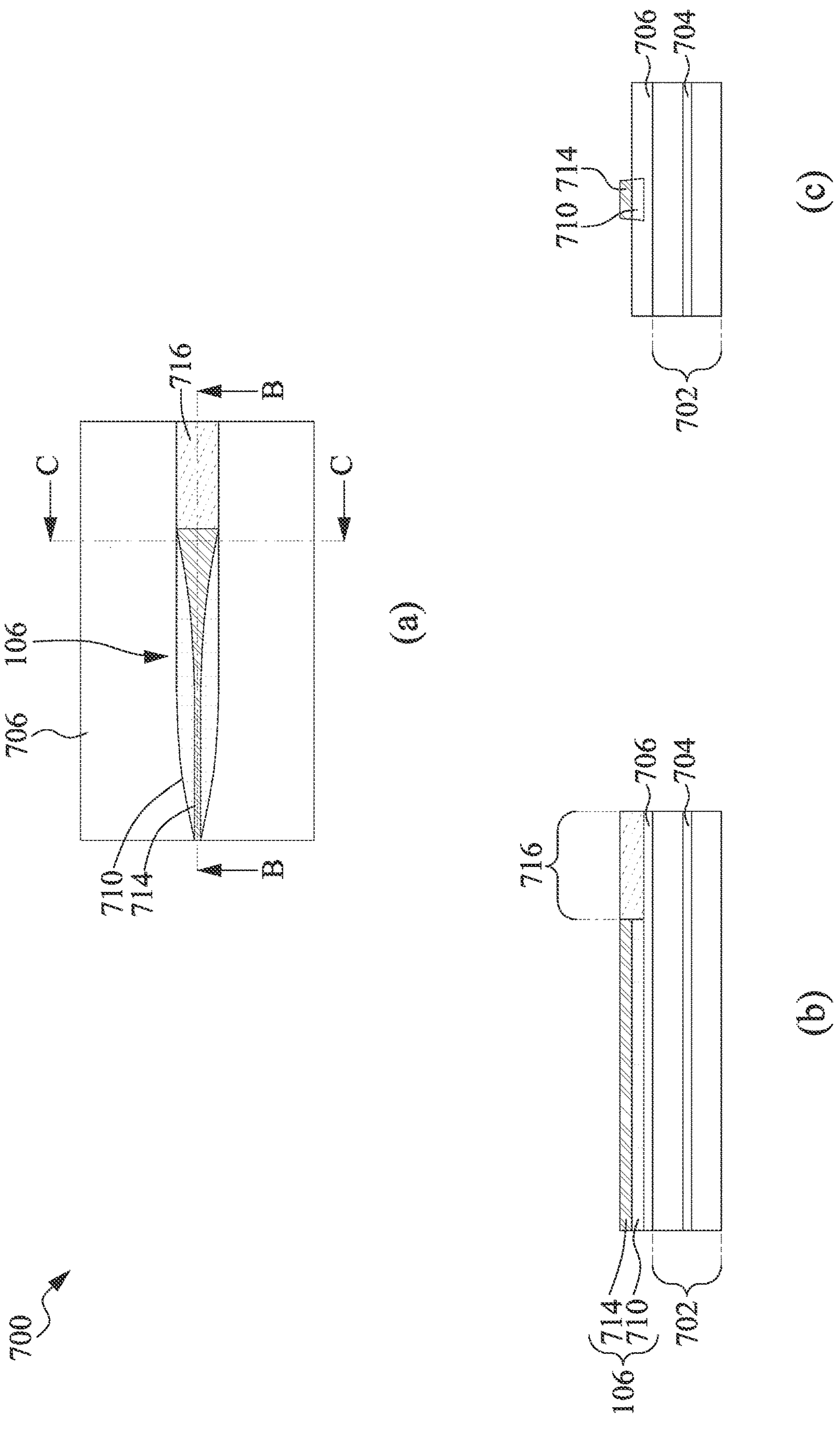

The waveguide (or at least portions thereof) 716 is formed in the trench T1, as shown in FIG. 7I. The waveguide 716 may be similar to the waveguide 112 shown in FIGS. 2A, 2B, 4A and 4C. The waveguide 716 may include undoped silicon, silicon nitride, polymers, or other suitable materials. In some embodiments, the material of the waveguide 716 is the same as that of the edge coupling member 710 or 714. The waveguide 716 may be formed by CVD, PVD, ALD, or other suitable operations.

Figure 7J:
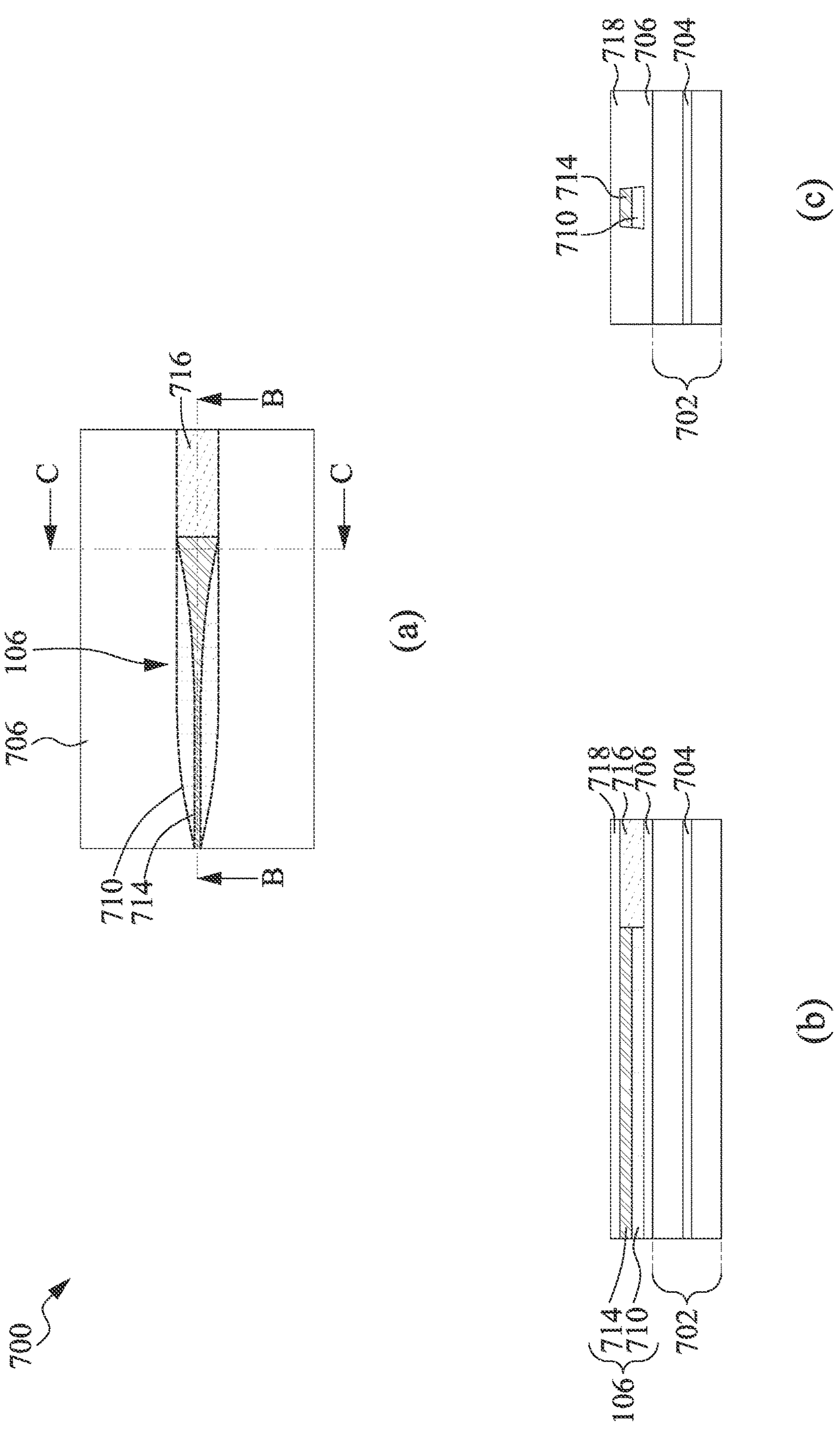

Referring to FIG. 7J, a cladding layer 718 is formed over the edge coupling members 710, 714 and the waveguide 716. In some embodiments, the cladding layer 718 is formed of silicon oxide or other suitable materials. The cladding layer 718 is formed to cover the edge coupling members 710, 714 and the waveguide 716. In some embodiments, the material and forming method of the cladding layer 718 is similar to those of the cladding layer 706.

FIGS. 8A to 8F show top views and cross-sectional views of intermediate stages of a method of forming an edge coupler 800, in accordance with some embodiments of the present disclosure. It shall be understood that additional steps can be provided before, during, and after the steps shown in FIGS. 8A to 8F, and some of the steps described below can be replaced with other steps or eliminated. The order of the steps may be interchangeable. Some of the steps may be performed concurrently or independently. The subplots (a), (b), and (c) in each of FIGS. 8A to 8F represent a top view, a first cross-sectional view and a second cross-section view, respectively, of the edge coupler 800, wherein the first cross-sectional view and the second cross-sectional view are taken from sectional lines BB and CC, respectively of the respective subplots (a).

Figure 8A:
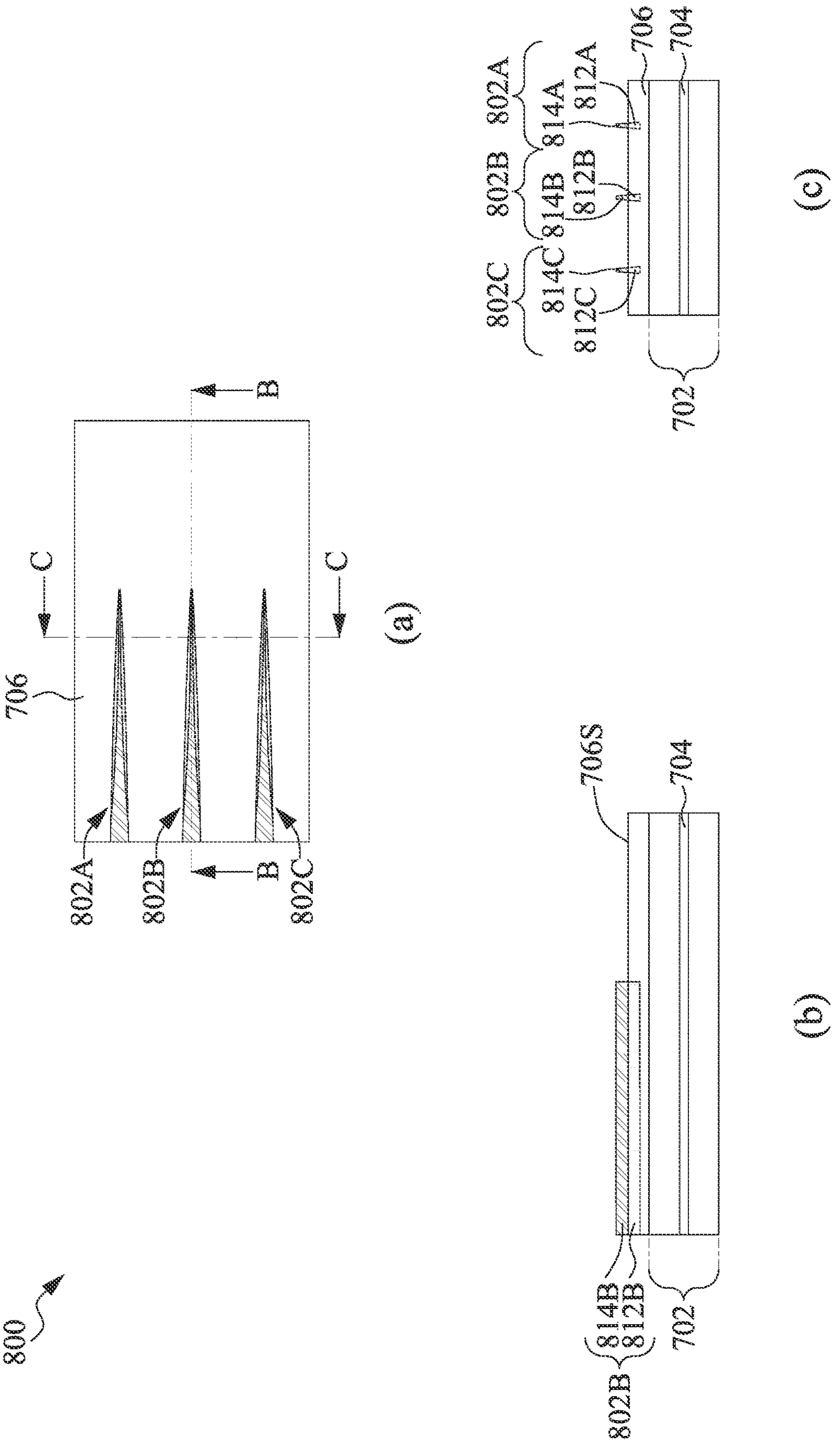
FIGS. 8A to 8F show top views and cross-sectional views of intermediate stages of a method of forming an edge coupler, in accordance with some embodiments of the present disclosure. Each of FIGS. 8A to 8F includes subplots (a), (b) and (c) corresponding to the top views and cross-sectional views, respectively.

Referring to FIG. 8A, a substrate 702 including an upper surface 702S is received or provided. The substrate 702 may be a silicon-on-insulator (SOI) substrate, in which an insulating layer 704 is embedded in the substrate 702. A cladding layer 706 with an upper surface 706S is formed over the substrate 702. Further, three instances of auxiliary edge couplers 802, e.g., 802A, 802B and 802C, are formed on the cladding layer 706. The auxiliary edge couplers 802 are similar to the dual-member edge couplers 106, 602 or 604. Each instance of the auxiliary edge couplers 802 includes a first edge coupling member 812, e.g., 812A, 812B, 812C, and a second edge coupling member 814, e.g., 814A, 814B, 814C. The edge coupling members 812 and 814 is used to perform optical coupling between an optical fiber and a waveguide though the TE mode and the TM mode, respectively, or vice versa. The edge coupling members 812 and 814 may be formed by patterning operations, which include lithography and etching operations. The etching operation may include a dry etch, a wet etch, a combination thereof (e.g., a reactive ion etch), or the like. In the depicted example, the edge coupling members 812 have a convex shape and the edge coupling members 814 have a concave shape.

Figure 8B:
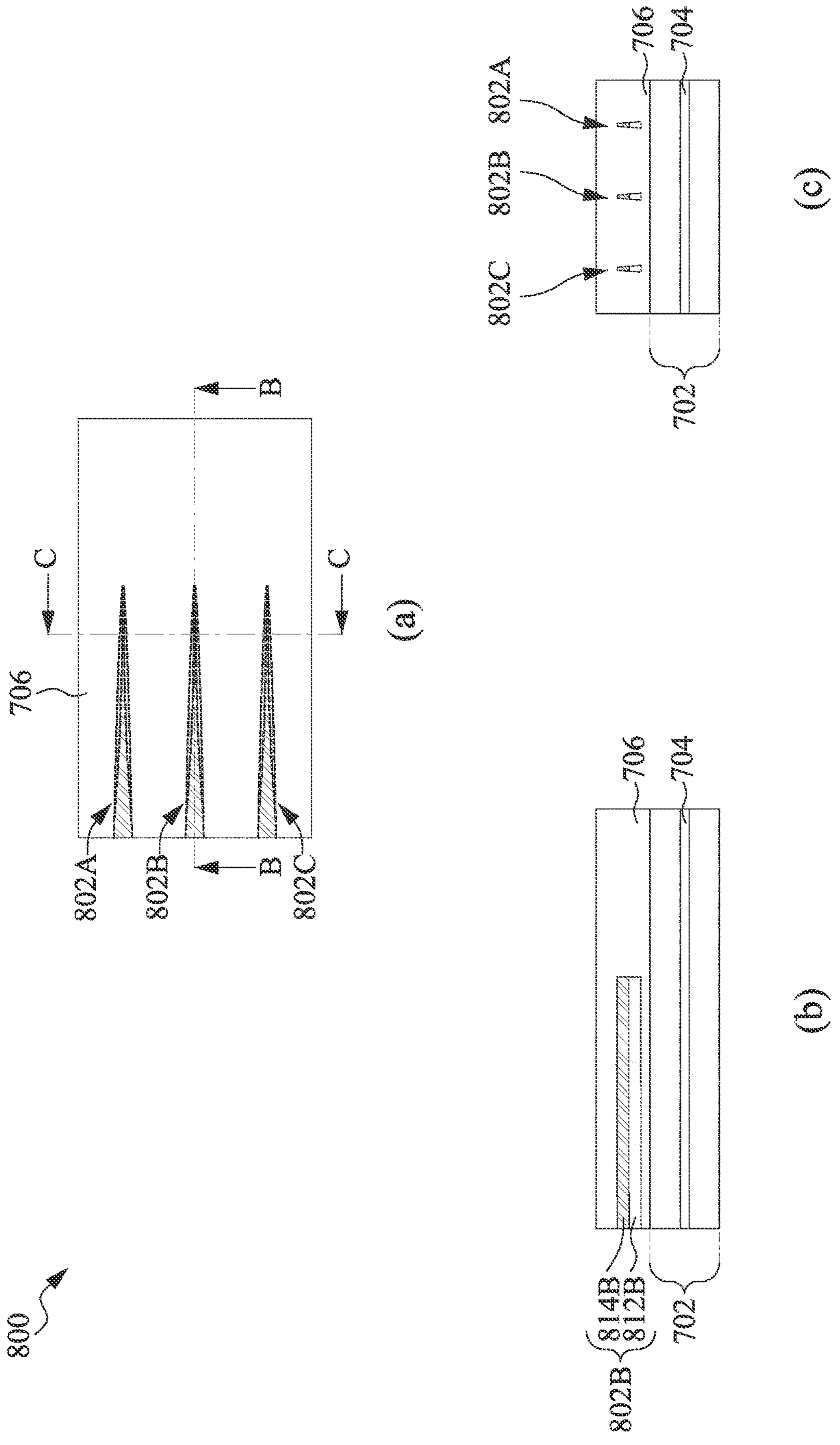

Referring to FIG. 8B, a deposition operation is performed to form a cladding layer 706. The cladding layer 706 has an upper surface higher than the upper surface of the auxiliary edge couplers 802. In some embodiments, the method and material for the deposition operation of the cladding layer 706 may be similar to those of the cladding layer 706 illustrated in FIG. 7B.

Figure 8C:
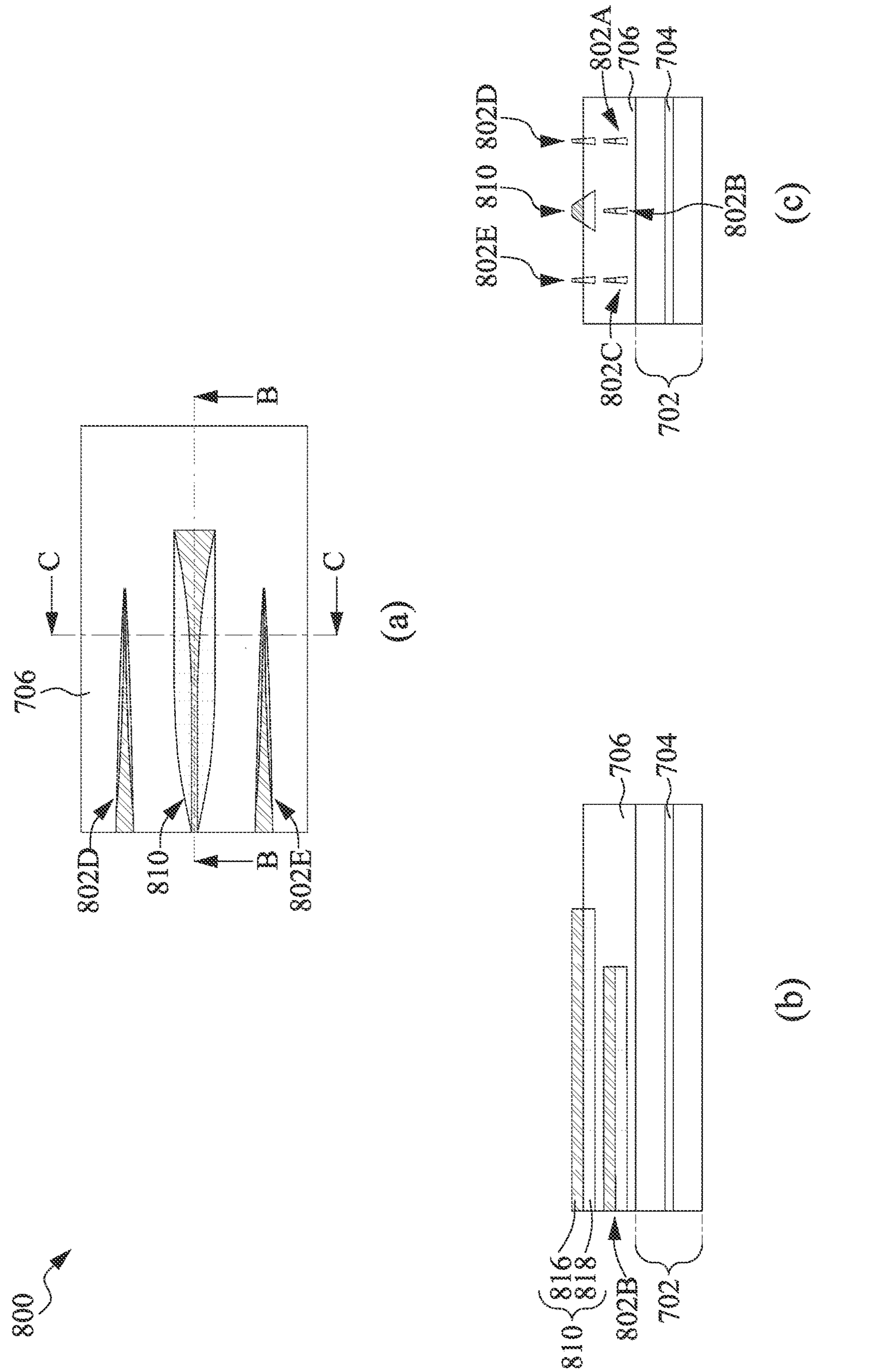

Referring to FIG. 8C, an edge coupler 810 and two auxiliary edge couplers 802D, 802E are formed on the cladding layer 706. The edge coupler 810 and the auxiliary edge couplers 802D and 802E are aligned with the auxiliary edge couplers 802B, 802A and 802C, respectively, in the vertical direction. In some embodiments, the edge coupler 810, which is similar to the edge couplers 106, includes a first edge coupling member 816 and a second edge coupling member 818, which are corresponding to the edge coupling member 202 and 204, respectively. The materials, configurations and method of formation of the edge coupler 810 and the auxiliary edge couplers 802D, 802E are similar to those of the edge coupler 700 and 602, 604, respectively.

Figure 8D:
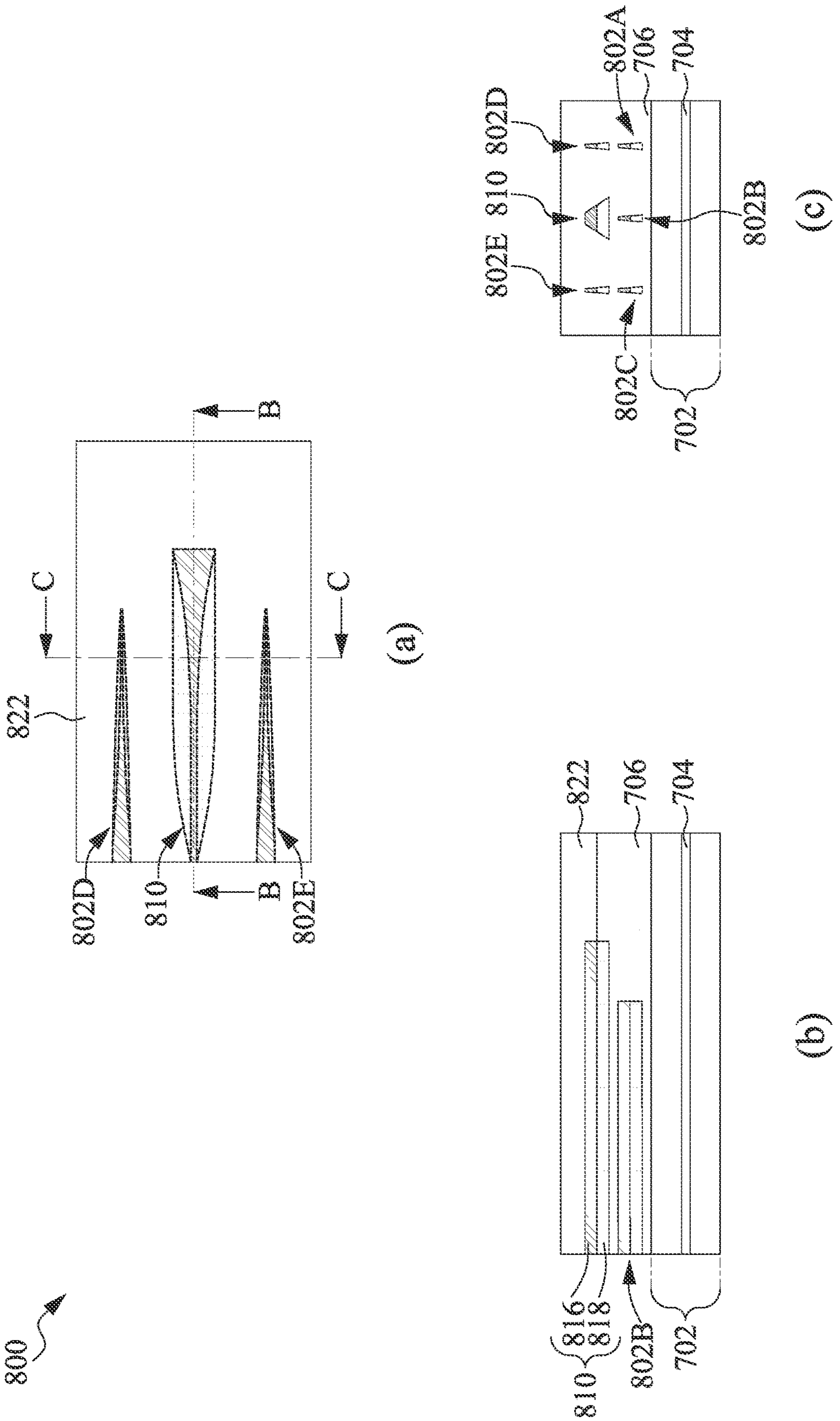

Referring to FIG. 8D, a deposition operation is performed to form a cladding layer 822. The cladding layer 822 has an upper surface higher than the upper surface of the edge couplers 810. In some embodiments, the method and material for the deposition operation of the cladding layer 822 may be similar to those of the cladding layer 706 illustrated in FIG. 7B.

Figure 8E:
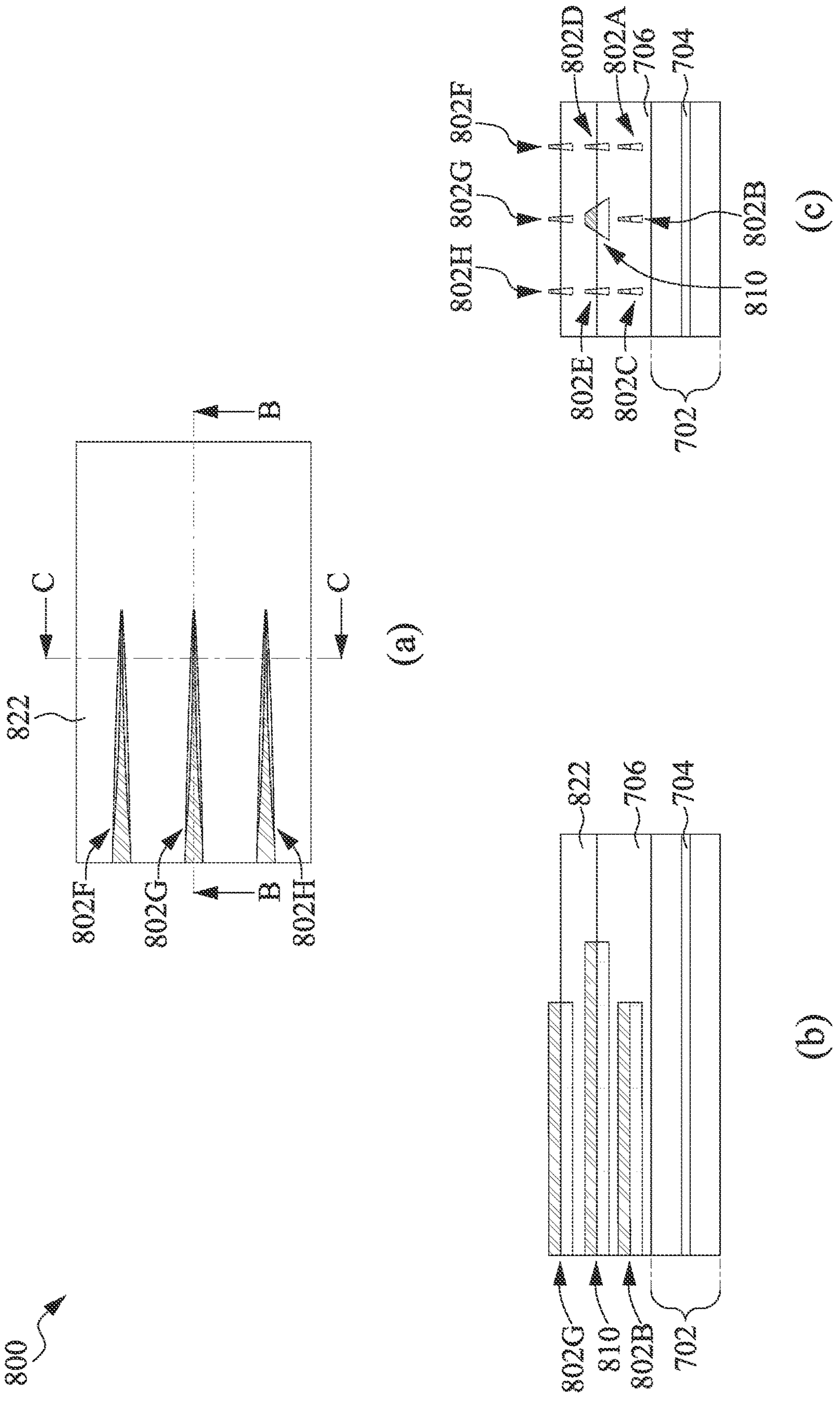

Referring to FIG. 8E, three instances of auxiliary edge couplers 802, e.g., 802F, 802G and 802H, are formed on the cladding layer 706. The auxiliary edge couplers 802 are similar to the dual-member edge couplers 106, 602, 604 or 612. Each instance of the auxiliary edge couplers 802 includes a first edge coupling member 812, e.g., 812F, 812G, 812H, and a second edge coupling member 814, e.g., 814F, 814G, 814H. The edge coupling members 812 and 814 is used to perform optical coupling between an optical fiber and a waveguide though the TE mode and the TM mode, respectively, or vice versa. The edge coupling units 812 and 814 may be formed by patterning operations, which include lithography and etching operations. The etching operation may include a dry etch, a wet etch, a combination thereof (e.g., a reactive ion etch), or the like. In the depicted example, the edge coupling members 812 have a convex shape and the edge coupling members 814 have a concave shape.

Figure 8F:
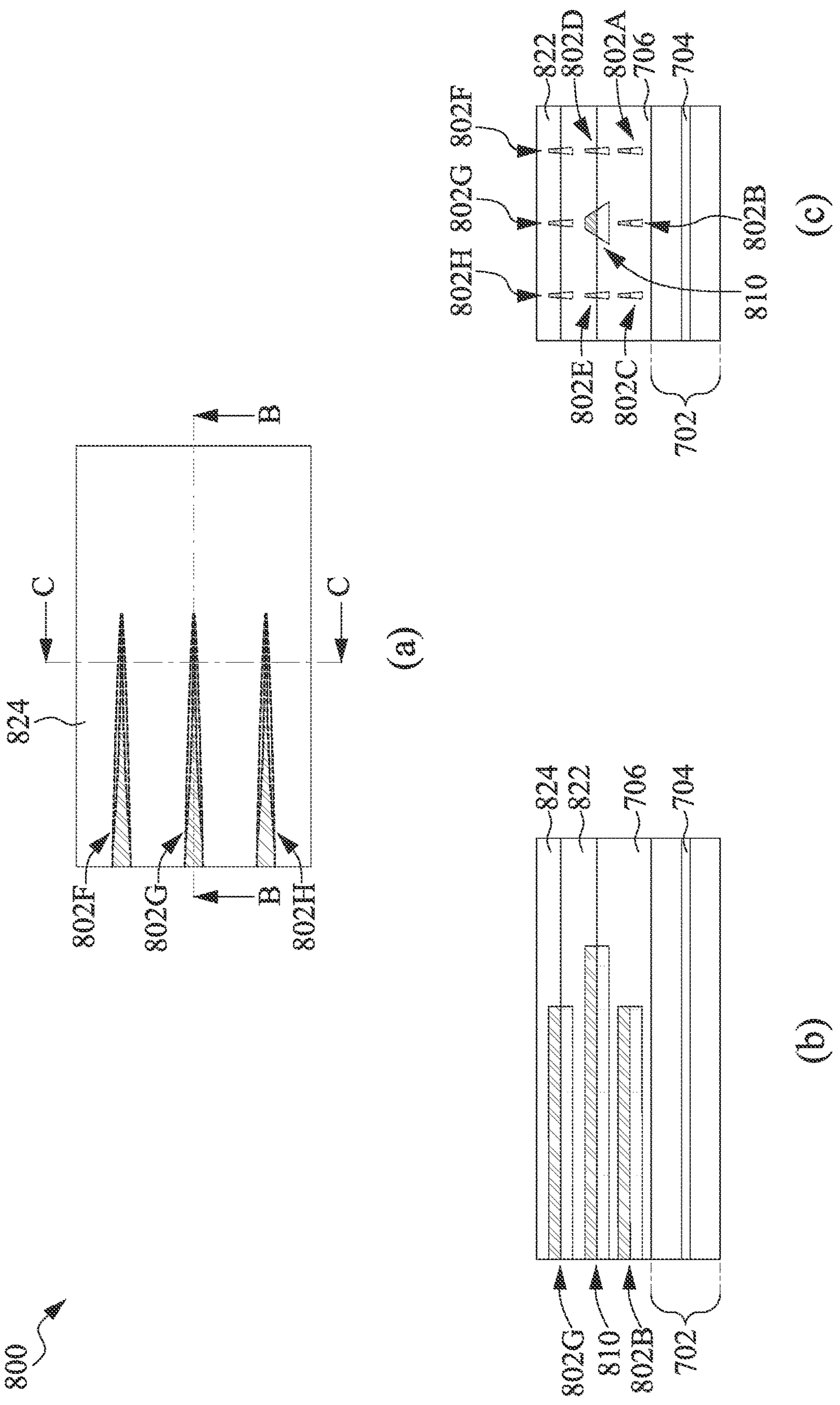

Referring to FIG. 8F, a cladding layer 824 is formed to cover the auxiliary edge couplers 802F, 802G and 802H. In some embodiments, the method and material for the deposition operation of the cladding layer 824 may be similar to those used in the formation of the cladding layer 706 illustrated in FIG. 7B.

Figure 9:
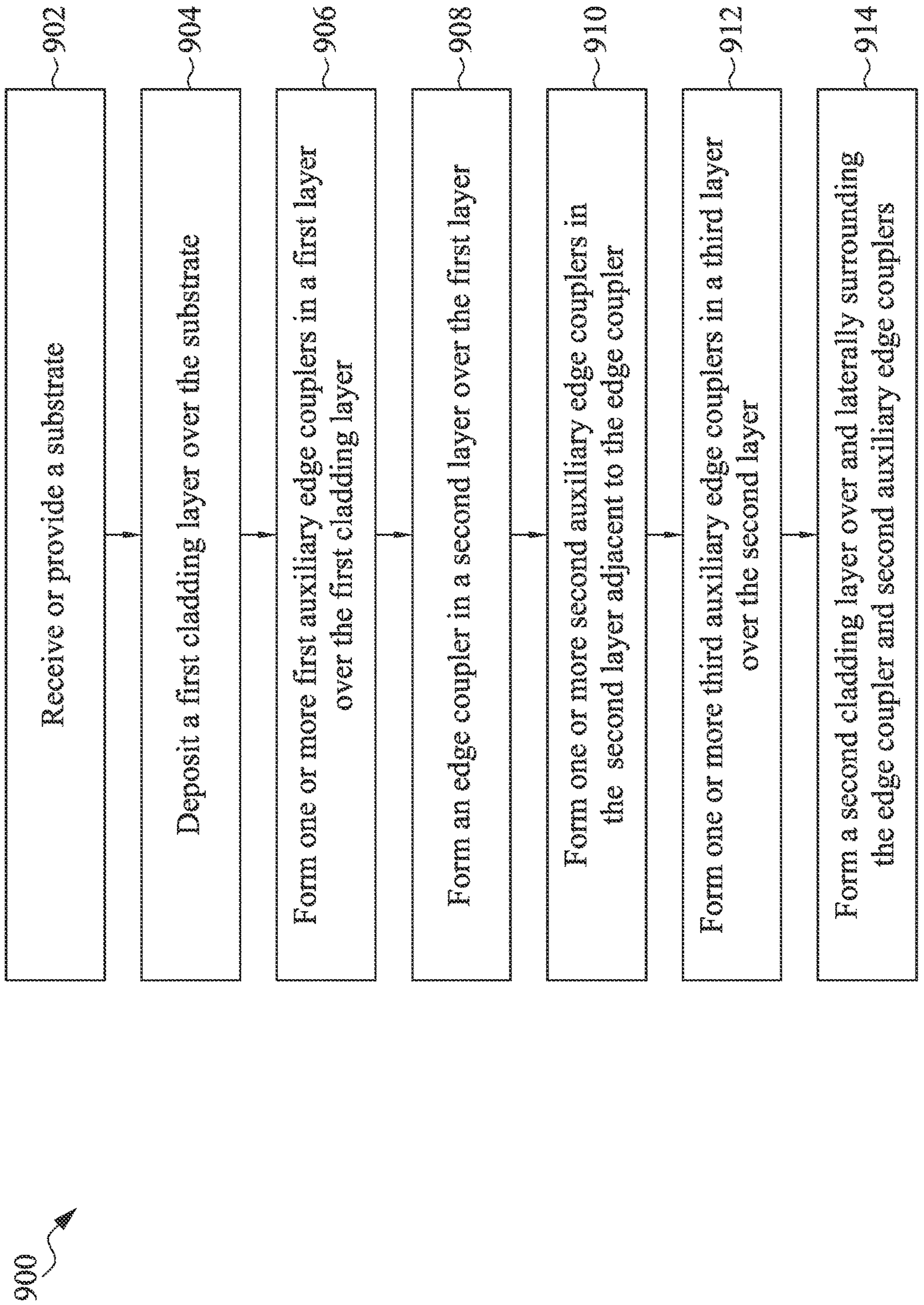
FIG. 9 is a flowchart of a method of manufacturing a photonic device, in accordance with some embodiments of the present disclosure.

FIG. 9 is a flowchart of a method 900 of manufacturing a photonic device, in accordance with some embodiments of the present disclosure. It shall be understood that additional steps can be provided before, during, and after the steps shown in FIG. 9, and some of the steps described below can be replaced with other steps or eliminated. The order of the steps may be interchangeable. Some of the steps may be performed concurrently or independently.

At step 902, a substrate, e.g., substrate 702, is received or provided. At step 904, a first cladding layer, e.g., the cladding layer 706 is deposited over the substrate.

At step 906, one or more first auxiliary edge couplers, e.g., auxiliary edge couplers 402B, 502A, 502B, 512A, 512B, 602B, 604A, 604B, 612A and 612B, are formed in a first layer, e.g., layer L1 or L6, over the first cladding layer. In some embodiments, step 906 is omitted. At step 908, an edge coupler, e.g., the edge coupler 106, is formed in a second layer, e.g., layer L3, over the first layer.

At step 910, one or more second auxiliary edge couplers, e.g., auxiliary edge couplers 402A, 402C, 602A and 602C, are formed in the second layer adjacent to the edge coupler. At step 912, one or more third auxiliary edge couplers e.g., auxiliary edge couplers 402D, 502C, 502D, 512C, 512D, 602D and 604C, 604D, 612C and 612D, are formed in a third layer, e.g., L5 or L7, over the second layer.

At step 914, a second cladding layer, e.g., the cladding layer 706 shown in FIG. 7J or the cladding layer 728 shown in FIG. 8F, is formed over and laterally surrounding the edge coupler and second auxiliary edge couplers.

In accordance with some embodiments of the present disclosure, a method is provided. The method includes: receiving a substrate; and forming an edge coupler on the substrate, the edge coupler configured to receive light. The forming includes: depositing a first edge coupling member extending in a first direction in a first layer over the substrate; and depositing a second edge coupling member extending in the first direction in a second layer over the first layer. Each of the first and second edge coupling members has a width measured in a second direction monotonically non-decreasing in the first direction. One of the first and second edge coupling members includes a portion in a concave shape and the other includes a portion in a convex shape.

In accordance with some embodiments of the present disclosure, a method is provided. The method includes: receiving a substrate; and forming a multi-tip edge coupler on the substrate. The forming includes: depositing an single-tip edge coupler on an edge of the substrate in a first layer, the single-tip edge coupler having a first width monotonically non-decreasing in a first direction; depositing a first auxiliary edge coupler on the edge of the substrate in a second layer over the first layer, the first auxiliary edge coupler having a second width monotonically non-increasing in the first direction; and depositing a second auxiliary edge coupler on the edge of the substrate in a third layer below the first layer, the second auxiliary edge coupler having a third side monotonically non-increasing in the first direction.

In accordance with some embodiments of the present disclosure, a photonic device includes: a first edge coupler, including: a first edge coupling member on a side of a substrate in a first layer, the first edge coupling member having a first width monotonically non-increasing in a first direction; and a second edge coupling member on the side of the substrate in a second layer over the first layer, the second edge coupling member having a second with non-monotonically increasing in the first direction. One of the first and second widths at least includes a portion with a concave shape and the other at least includes a portion with a convex shape. The second edge coupling member is fully overlapped with the first edge coupling member.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
- receiving a substrate; and
- forming a composite edge coupler on the substrate, the composite edge coupler configured to receive light, and the forming comprising:
  - depositing a first edge coupler, extending in a first direction in which the light propagates and allowing the light to pass through, in a first layer over the substrate; and
  - depositing a second edge coupler, extending in the first direction and allowing the light to pass through, in a second layer over the first layer,
- wherein each of the first and second edge couplers has a width measured in a second direction perpendicular to the first direction, wherein the width progressively increases from a first end configured to receive the light to a second end opposite the first end of each of the first and second edge couplers,
- wherein one of the first or second edge couplers comprises a concave shape, the concave shape curving inward toward a center point of optical signal propagation and extending from the first end to the second end, and the other comprises a convex shape, the convex shape curving outward from the center point and extending from the first end to the second end.

2. The method of claim 1, further comprising depositing a cladding layer over and laterally surrounding the composite edge coupler.

3. The method of claim 1, wherein the first edge coupler and the second edge coupler are formed of different materials.

4. The method of claim 1, wherein the first edge coupler or the second edge coupler is formed of one selected from the group consisting of silicon, silicon nitride and polymer.

5. The method of claim 1, wherein the first and second edge couplers have substantially equal lengths measured in the first direction.

6. The method of claim 1, further comprising forming a waveguide in the substrate, the waveguide extending in the first direction and coupled to the composite edge coupler.

7. The method of claim 1, wherein the first edge coupler and the second edge coupler further include a substantially uniform thickness from the first end to the second end.

8. The method of claim 1, wherein the first edge coupler and the second edge coupler further comprise substantially equal widths at the first end.

9. The method of claim 8, wherein the first edge coupler is exposed through the second edge coupler.

10. The method of claim 1, wherein the second edge coupler is formed directly on an upper surface of the first edge coupler.

11. The method of claim 1, wherein the first edge coupler and the second edge coupler comprise substantially equal widths at the second end.

12. A method, comprising:
- receiving a substrate; and
- forming a composite edge coupler on the substrate, the composite edge coupler configured to receive light, and the forming comprising:
  - depositing a first edge coupler extending in a first direction, in which the light propagates, in a first layer over the substrate; and
  - depositing a second edge coupler extending in the first direction in a second layer over the first layer,
  - wherein one of the first or second edge coupling members couplers is in a concave shape, the concave shape curving inward toward a center point of optical signal propagation and extending from a first end of the first or second edge coupler configured to receive light to a second end opposite to the first end, and the other is in a convex shape, the convex shape curving outward from the center point and extending from the first end to the second end.

13. The method of claim 12, wherein the first end of the first edge coupler coincides with the first end of the second edge coupler on one side of the substrate.

14. The method of claim 12, further comprising forming a waveguide over the substrate and coupled to the first and second edge couplers, wherein from a top-view perspective, the first edge coupler has a first width that progressively decreases with an increasing distance from the waveguide, and the second edge coupler has a second width that progressively decreases with an increasing distance from the waveguide.

15. The method of claim 14, wherein the first edge coupler comprises a first end portion that interfaces with the waveguide, the second edge coupler comprises a second end portion that interfaces with the waveguide, and the first end portion and the second end portion have substantially equal widths.

16. The method of claim 12, further comprising depositing a cladding layer over and laterally surrounding the composite edge coupler, wherein the cladding layer comprises a refractive index less than a refractive index of the composite edge coupler.

17. The method of claim 12, wherein the each of the first and second edge couplers have substantially equal lengths measured in the first direction.

18. A method, comprising:

receiving a substrate; and forming a composite edge coupler on the substrate, the composite edge coupler configured to receive light, and the forming comprising:

depositing a first edge coupler in a first layer, the first edge coupler having a first width progressively increasing along a first direction in which the light propagates; and depositing a second edge coupler in a second layer over the first layer, the second edge coupler having a second width progressively increasing along the first direction, wherein the first edge coupler is in a convex shape, the convex shape curving outward from a center point of optical signal propagation and extending from a first end of the first or second edge coupler configured to receive light to a second end opposite to the first end, and the second edge coupler is in a concave shape, the concave shape curving inward toward the center point and extending from the first end to the second end.

19. The method of claim 18, wherein the first and second edge couplers have substantially equal thicknesses in a second direction perpendicular to the first direction.

20. The method of claim 18, wherein the second edge coupler is fully overlapped with the first edge coupler from a top-view perspective.

* * * * *